United States Patent
Naegle et al.

(10) Patent No.: US 6,952,214 B2
(45) Date of Patent: Oct. 4, 2005

(54) METHOD FOR CONTEXT SWITCHING A GRAPHICS ACCELERATOR COMPRISING MULTIPLE RENDERING PIPELINES

(75) Inventors: Nathaniel David Naegle, Pleasanton, CA (US); William E. Sweeney, Jr., Fremont, CA (US); Wayne A. Morse, Fremont, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 436 days.

(21) Appl. No.: 10/194,446

(22) Filed: Jul. 12, 2002

(65) Prior Publication Data

US 2004/0008200 A1 Jan. 15, 2004

(51) Int. Cl.$^7$ .................................................. G06T 1/20
(52) U.S. Cl. ........................ 345/506; 345/505; 718/108
(58) Field of Search ................................ 345/501, 502, 345/503, 505, 506, 530; 718/108, 107, 100, 102; 712/220, 225, 228

(56) References Cited

U.S. PATENT DOCUMENTS

| 5,430,841 A | * | 7/1995 | Tannenbaum et al. ...... 345/502 |
| 5,564,009 A | * | 10/1996 | Pinedo et al. ............... 345/506 |
| 6,047,122 A | | 4/2000 | Spiller |
| 6,208,361 B1 | * | 3/2001 | Gossett ........................ 345/506 |
| 6,437,788 B1 | * | 8/2002 | Milot et al. ................. 345/502 |
| 2002/0085007 A1 | | 7/2002 | Nelson et al. |
| 2003/0169259 A1 | | 9/2003 | Lavelle et al. |

* cited by examiner

*Primary Examiner*—Kee M. Tung
(74) *Attorney, Agent, or Firm*—Meyertons Hood Kivlin Kowert & Goetzel, P.C.; Jeffrey C. Hood; Mark K. Brightwell

(57) ABSTRACT

A graphics system comprising a plurality of rendering pipelines and a scheduling network. Each rendering pipeline couples to the scheduling network, and includes a media processor, a rendering unit and a memory. A communication bus may couple the scheduling network and the memory of each rendering pipeline. The media processor in each rendering pipeline may direct the saving of state information of the corresponding rendering pipeline to the corresponding memory in response to receiving a corresponding context switch indication. A first of the media processors initiates the transfer of a resume token to the scheduling network through the corresponding rendering pipeline if the context switch occurs during an ordered processing mode. The scheduling network unblocks one or more rendering pipelines other than the first rendering pipeline in response to receiving the resume token.

27 Claims, 19 Drawing Sheets

METHOD FOR CONTEXT SWITCHING A GRAPHICS ACCELERATOR COMPRISING MULTIPLE RENDERING PIPELINES

BACKGROUND OF THE INVENTION

1. Field of the Invention

This invention relates generally to the field of graphics hardware and, more particularly, to a system for performing context switching within a graphics hardware accelerator.

2. Description of the Related Art

A number of threads executing on a computer system may request the services of a graphics accelerator. The threads may execute in a time-shared fashion on the computer system. Thus, it is desirable for the graphics accelerator to perform context switching. In a context switch, the graphics accelerator saves its current state information, and loads the state information corresponding to the next execution thread.

SUMMARY

In one set of embodiments, a graphics system may include a rendering engine, a scheduling network, a sample buffer and a filtering engine. The rendering engine may include a plurality of rendering pipelines. Each of the rendering pipelines may couple to the scheduling network, and may include a media processor, a rendering unit and a memory (e.g. an RDRAM memory). A communication bus may couple the scheduling network and the memory of each rendering pipeline.

The media processor in each of the rendering pipelines may be configured to direct the saving of state information of the corresponding rendering pipeline to the corresponding memory in response to receiving a corresponding context switch indication. Furthermore, a first of the media processors in a first of the rendering pipelines may be configured to initiate the transfer of a resume token to the scheduling network through the first rendering pipeline in response to receiving the corresponding context switch indication during an ordered processing mode.

The scheduling network may be configured to unblock one or more rendering pipelines other than the first rendering pipeline in response to receiving the resume token, wherein said unblocking of the one or more rendering pipelines allows the state information of the one or more rendering pipelines to flow through the scheduling network and communication bus to the corresponding memories.

BRIEF DESCRIPTION OF THE DRAWINGS

A better understanding of the present invention can be obtained when the following detailed description is considered in conjunction with the following drawings, in which.

Figure 1:
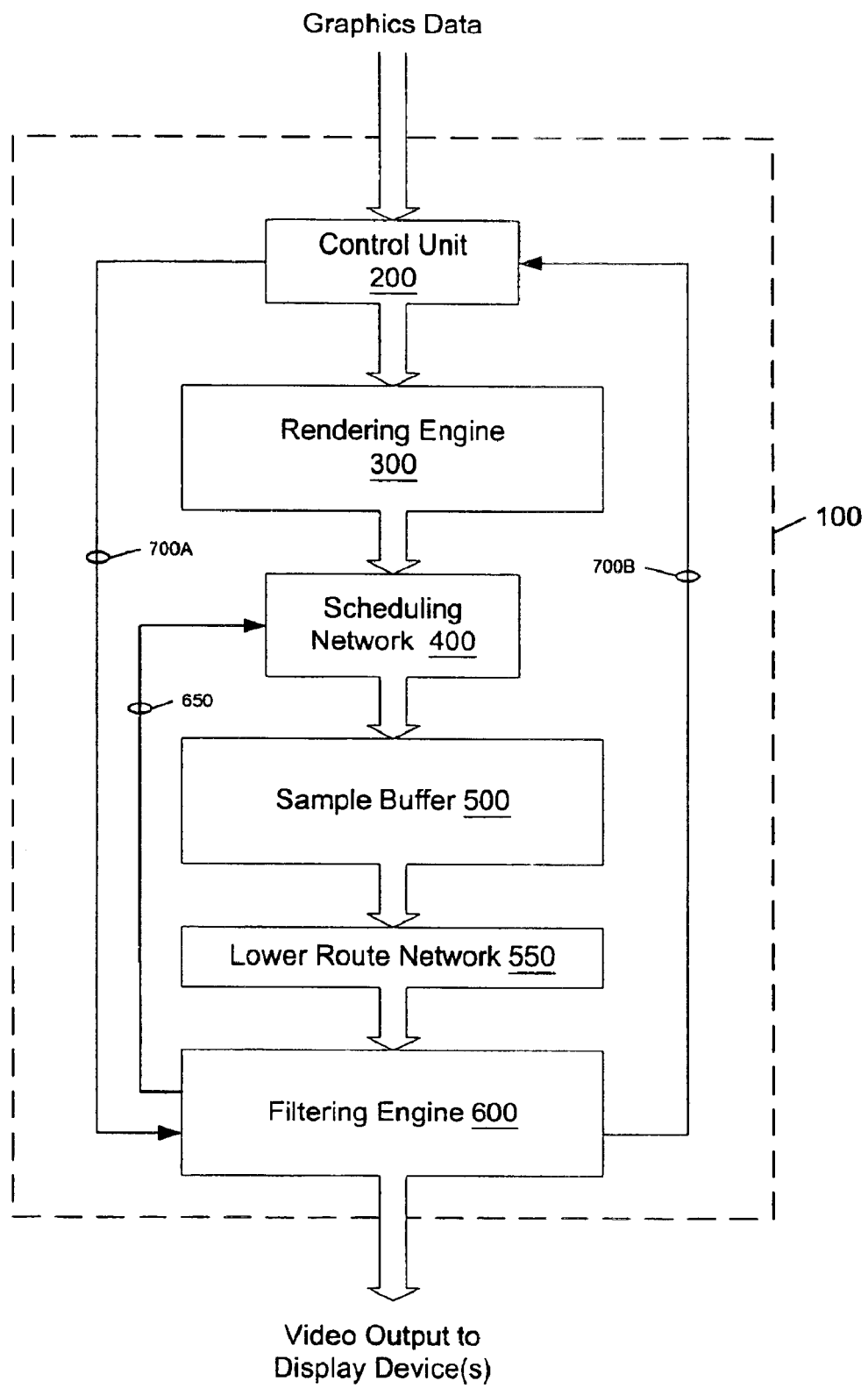
FIG. 1 illustrates one set of embodiments of a graphics accelerator configured to perform graphical computations.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

FIG. 1 illustrates one set of embodiments of a graphics accelerator 100 configured to perform graphics computations (especially 3D graphics computations). Graphics accelerator 100 may include a control unit 200, a rendering engine 300, a scheduling network 400, a sample buffer 500, a lower route network 550, and a filtering engine 600.

Figure 2:
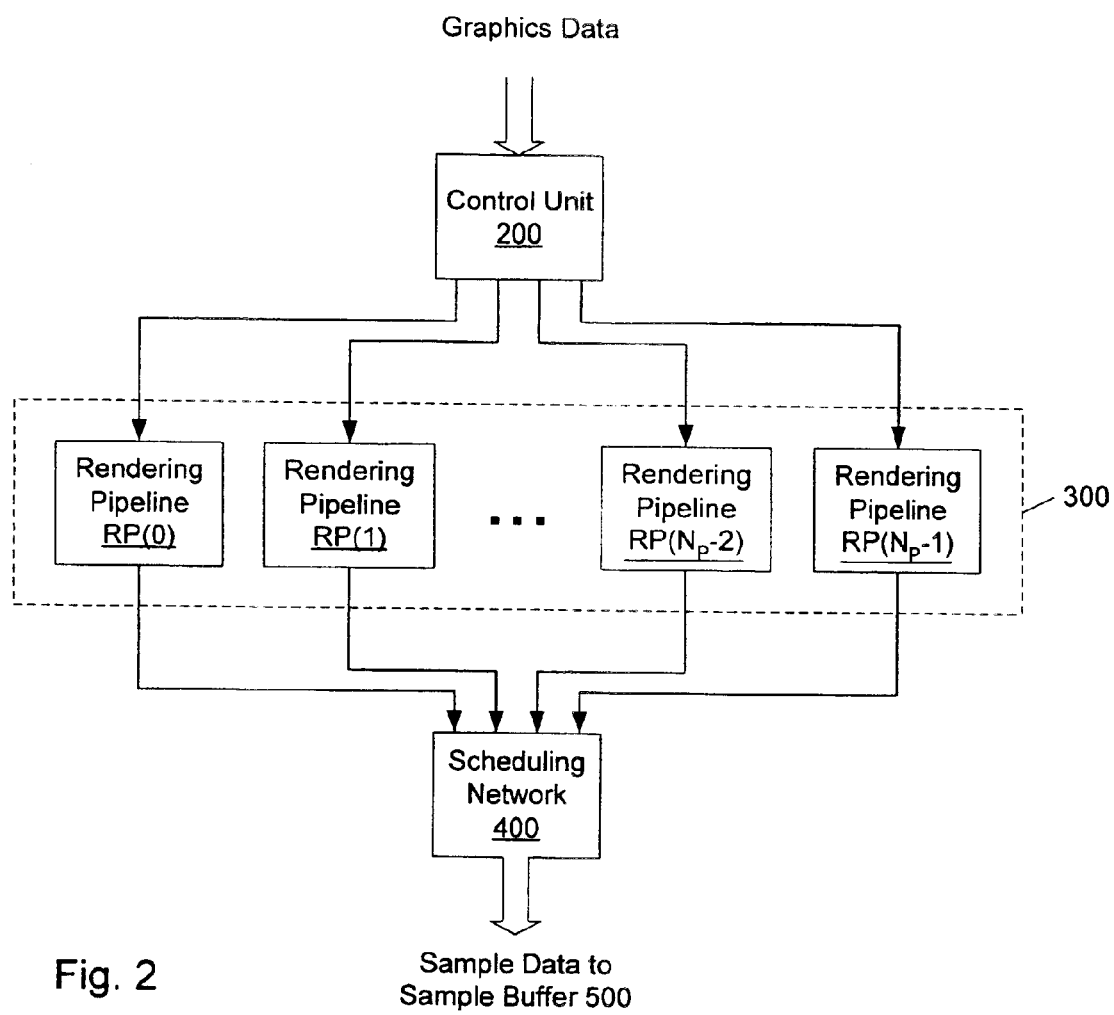
FIG. 2 illustrates one set of embodiments of a parallel rendering engine.

The rendering engine 300 may include a set of $N_{PL}$ rendering pipelines as suggested by FIG. 2, where $N_{PL}$ is a positive integer. The rendering pipelines, denoted as RP(0) through RP($N_{PL}$-1), are configured to operate in parallel. For example, in one embodiment, $N_{PL}$ equals four. In another embodiment, $N_{PL}$=8.

The control unit 200 receives a stream of graphics data from an external source (e.g. from the system memory of a host computer), and controls the distribution of the graphics data to the rendering pipelines. The control unit 200 may divide the graphics data stream into $N_{PL}$ substreams, which flow to the $N_{PL}$ rendering pipelines respectively. The control unit 200 may implement an automatic load-balancing scheme so the host application need not concern itself with load balancing among the multiple rendering pipelines.

The stream of graphics data received by the control unit 200 may correspond to a frame of a 3D animation. The frame may include a number of 3D objects. Each object may be described by a set of primitives such as polygons (e.g. triangles), lines, polylines, dots, etc. Thus, the graphics data stream may contain information defining a set of primitives.

Polygons are naturally described in terms of their vertices. Thus, the graphics data stream may include a stream of vertex instructions. A vertex instruction may specify a position vector (X,Y,Z) for a vertex. The vertex instruction may also include one or more of a color vector, a normal vector and a vector of texture coordinates. The vertex instructions may also include connectivity information, which allows the rendering engine 300 to assemble the vertices into polygons (e.g. triangles).

Each rendering pipeline RP(K) of the rendering engine 300 may receive a corresponding stream of graphics data from the control unit 200, and performs rendering computations on the primitives defined by the graphics data stream. The rendering computations generate samples, which are written into sample buffer 500 through the scheduling network 400.

The filtering engine 600 is configured to read samples from the sample buffer 500, to perform a filtering operation on the samples resulting in the generation of a video pixel stream, and, to convert the video pixel stream into an analog video signal. The analog video signal may be supplied to one or more video output ports for display on one or more display devices (such as computer monitors, projectors, head-mounted displays and televisions).

Furthermore, the graphics system 100 may be configured to generate up to $N_D$ independent video pixel streams denoted VPS(0), VPS(1), . . . , VPS($N_D$-1), where ND is a positive integer. Thus, a set of host applications (running on a host computer) may send $N_D$ graphics data streams denoted GDS(0), GDS(1), . . . , GDS($N_D$-1) to the graphics system 100. The rendering engine 300 may perform rendering computations on each graphics data stream GDS(I), for I=0, 1, 2, . . . , $N_D$-1, resulting in sample updates to a corresponding region SBR(I) of the sample buffer 500. The filtering engine 600 may operate on the samples from each sample buffer region SBR(I) to generate the corresponding video pixel stream VPS(I). The filtering engine 600 may convert each video pixel stream VPS(I) into a corresponding analog video signal AVS(I). The ND analog video signals may be supplied to a set of video output ports for display on a corresponding set of display devices. In one embodiment, ND equals two. In another embodiment, ND equals four.

The filtering engine 600 may send sample data requests to the scheduling network 400 through a request bus 650. In response to the sample data requests, scheduling network 400 may assert control signals, which invoke the transfer of the requested samples (or groups of samples) to the filtering engine 600.

In various embodiments, the sample buffer 500 includes a plurality of memory units, and the filtering engine 600 includes a plurality of filtering units. The filtering units interface may interface with the lower router network 550 to provide data select signals. The lower route network 550 may use the data select signals to steer data from the memory units to the filtering units.

The control unit 200 may couple to the filtering engine 600 through a bus 700, which includes an outgoing segment 700A and a return segment 700B. The outgoing segment 700A may be used to download parameters (e.g. lookup table values) to the filtering engine 600. The return segment 700B may be used as a readback path for the video pixels generated by filtering engine 600. Video pixels transferred to control unit 200 through the return segment 700B may be forwarded to system memory (i.e. the system memory of a host computer), or perhaps, to memory (e.g. texture memory) residing on graphics system 100 or on another graphics accelerator.

The control unit 200 may include direct memory access (DMA) circuitry. The DMA circuitry may be used to facilitate (a) the transfer of graphics data from system memory to the control unit 200, and/or, (b) the transfer of video pixels (received from the filtering engine 600 through the return segment 700B) to any of various destinations (such as the system memory of the host computer).

Figure 3:
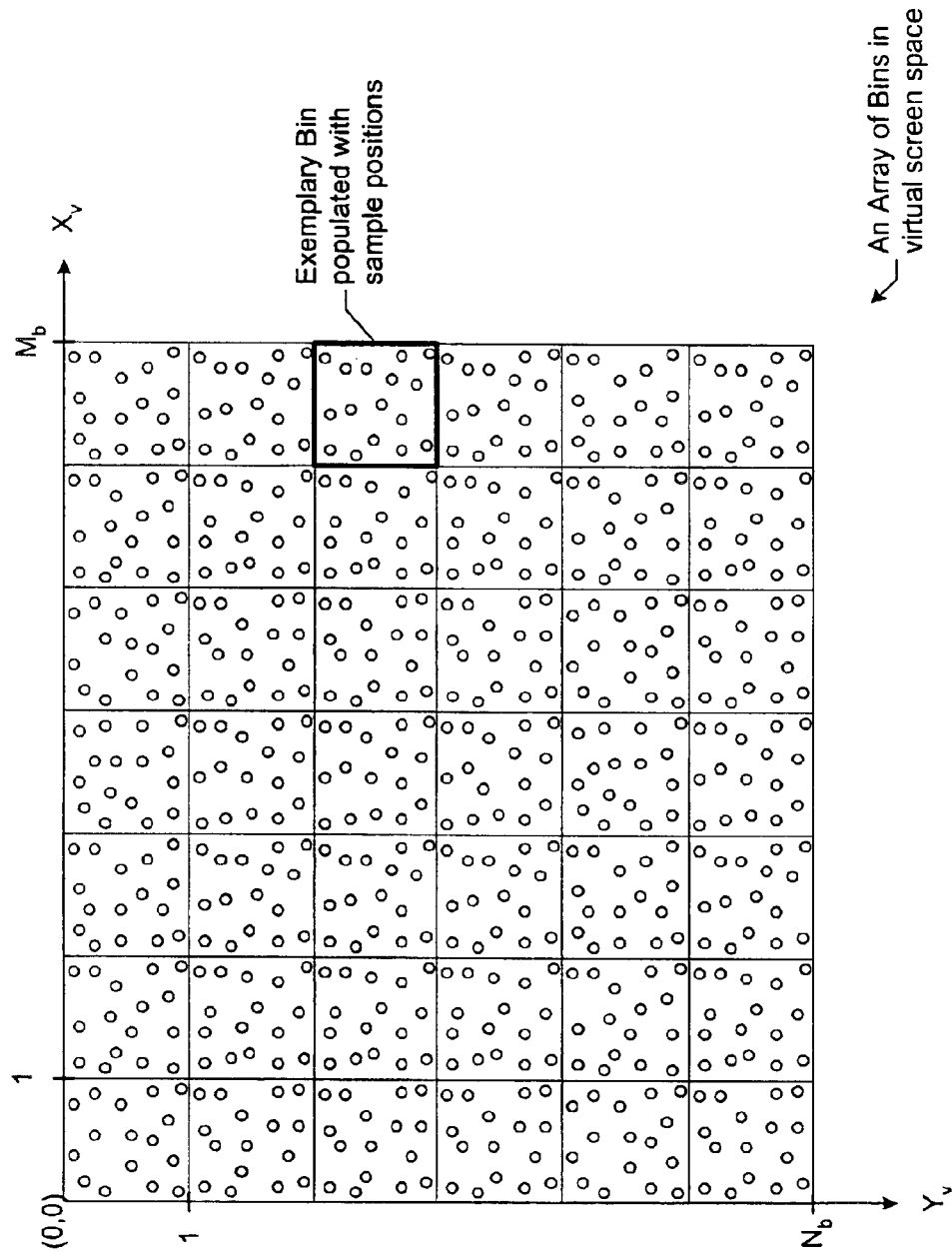
FIG. 3 illustrates an array of spatial bins each populated with a set of sample positions in a two-dimension virtual screen space.

The rendering pipelines of the rendering engine 300 may compute samples for the primitives defined by the received graphics data stream(s). The computation of samples may be organized according to an array of spatial bins as suggested by FIG. 3. The array of spatial bins defines a rectangular window in a virtual screen space. The spatial bin array may have dimension $M_B \times N_B$, i.e., may comprise MB bins horizontally and $N_B$ bins vertically.

Each spatial bin may be populated with a number of sample positions. Sample positions are denoted as small circles. Each sample position may be defined by a horizontal offset and a vertical offset with respect to the origin of the bin in which it resides. The origin of a bin may be at its top-left corner. Note that any of a variety of other positions on the boundary or in the interior of a bin may serve as its origin. A sample may be computed at each of the sample positions. A sample may include a color vector, and other values such as z depth and transparency (i.e. an alpha value).

The sample buffer 500 may organize the storage of samples according to memory bins. Each memory bin corresponds to one of the spatial bins, and stores the samples for the sample positions in a corresponding spatial bin.

If a rendering pipeline RP(k) determines that a spatial bin intersects with a given primitive (e.g. triangle), the rendering pipeline may:

(a) generate $N_{s/b}$ sample positions in the spatial bin;

(b) determine which of the $N_{s/b}$ sample positions reside interior to the primitive;

(c) compute a sample for each of the interior sample positions, and (d) forward the computed samples to the scheduling network 400 for transfer to the sample buffer 500.

The computation of a sample at a given sample position may involve computing sample components such as red, green, blue, z, and alpha at the sample position. Each sample component may be computed based on a spatial interpolation of the corresponding components at the vertices of the primitive. For example, a sample's red component may be computed based on a spatial interpolation of the red components at the vertices of the primitive.

In addition, if the primitive is to be textured, one or more texture values may be computed for the intersecting bin. The final color components of a sample may be determined by combining the sample's interpolated color components and the one or more texture values.

Each rendering pipeline RP(K) may include dedicated circuitry for determining if a spatial bin intersects a given primitive, for performing steps (a), (b) and (c), for computing the one or more texture values, and for applying the one or more texture values to the samples.

Each rendering pipeline RP(K) may include programmable registers for the bin array size parameters $M_B$ and $N_B$ and the sample density parameter $N_{s/b}$. In one embodiment, $N_{s/b}$ may take values in the range from 1 to 16 inclusive.

Sample Rendering Methodology

Figure 4:
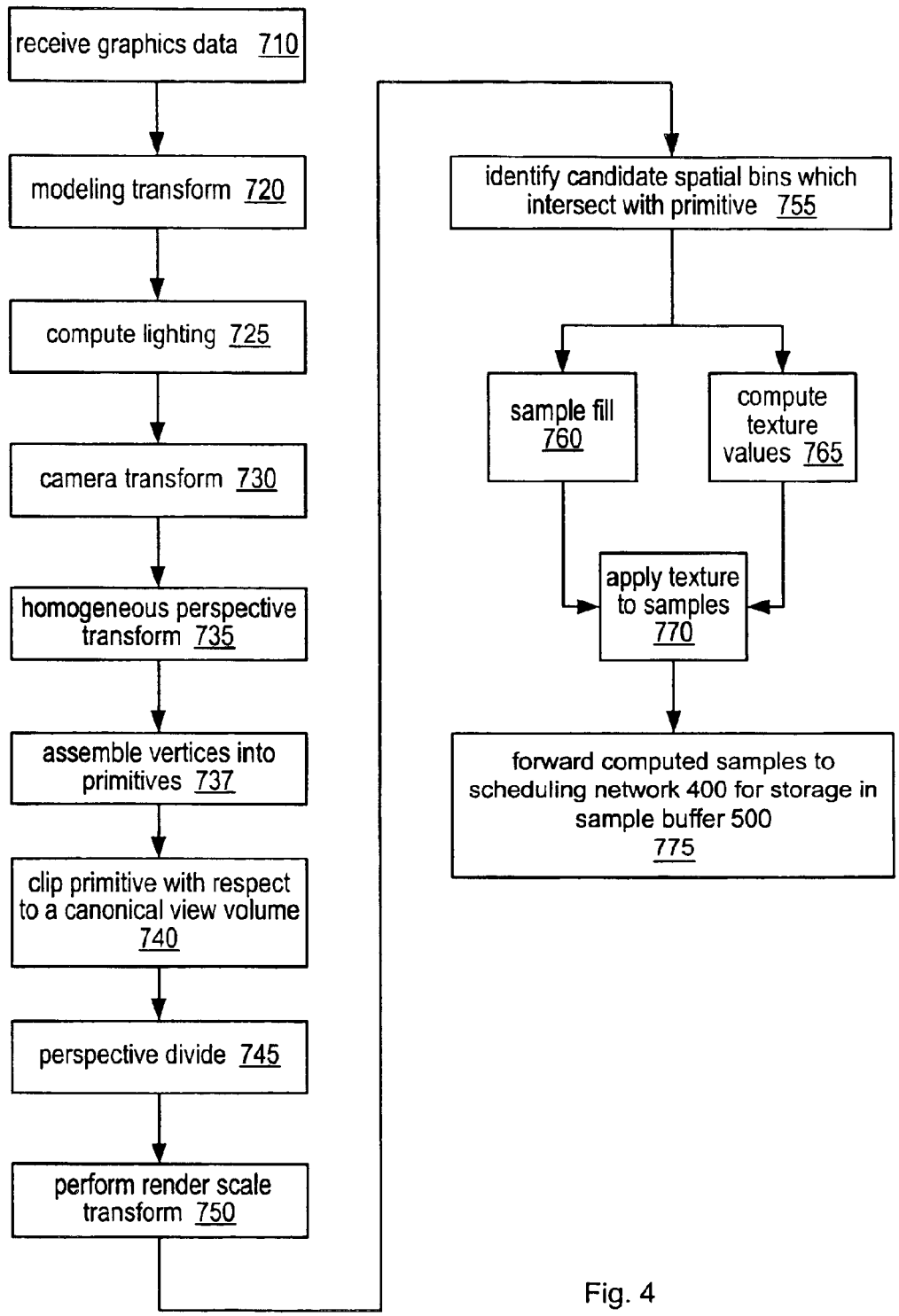
FIG. 4 illustrates one set of embodiments of a rendering methodology which may be used to generate samples in response to received stream of graphics data.

FIG. 4 illustrates one set of embodiments of a rendering process implemented by each rendering pipeline RP(K) of the $N_{PL}$ rendering pipelines.

In step 710, rendering pipeline RP(K) receives a stream of graphics data from the control unit 200 (e.g. stores the graphics data in an input buffer).

The graphics data may have been compressed according to any of a variety of data compression and/or geometry compression techniques. Thus, the rendering pipeline RP(K) may decompress the graphics data to recover a stream of vertices.

In step 720, the rendering pipeline RP(K) may perform a modeling transformation on the stream of vertices. The modeling transformation serves to inject objects into a world coordinate system. The modeling transformation may also include the transformation of any normal vectors associated with the stream vertices. The matrix used to perform the modeling transformation is dynamically programmable by host software.

In step 725, rendering engine 300 may subject the stream vertices to a lighting computation. Lighting intensity values (e.g. color intensity values) may be computed for the vertices of polygonal primitives based on one or more of the following:

(1) the vertex normals;
(2) the position and orientation of a virtual camera in the world coordinate system;
(3) the intensity, position, orientation and type-classification of light sources; and
(4) the material properties of the polygonal primitives such as their intrinsic color values, ambient, diffuse, and/or specular reflection coefficients.

The vertex normals (or changes in normals from one vertex to the next) may be provided as part of the graphics data stream. The rendering pipeline RP(K) may implement any of a wide variety of lighting models. The position and orientation of the virtual camera are dynamically adjustable. Furthermore, the intensity, position, orientation and type-classification of light sources are dynamically adjustable.

It is noted that separate virtual camera positions may be maintained for the viewer's left and right eyes in order to support stereo video. For example, rendering pipeline RP(K) may alternate between the left camera position and the right camera position from one animation frame to the next.

In step 730, the rendering pipeline RP(K) may perform a camera transformation on the vertices of the primitive. The camera transformation may be interpreted as providing the coordinates of the vertices with respect to a camera coordinate system, which is rigidly bound to the virtual camera in the world space. Thus, the camera transformation may require updating whenever the camera position and/or orientation change. The virtual camera position and/or orientation may be controlled by user actions such as manipulations of an input device (such as a joystick, data glove, mouse, light pen, and/or keyboard). In some embodiments, the virtual camera position and/or orientation may be controlled based on measurements of a user's head position and/or orientation and/or eye orientation(s).

In step 735, the rendering pipeline RP(K) may perform a homogenous perspective transformation to map primitives from the camera coordinate system into a clipping space, which is more convenient for a subsequent clipping computation. In some embodiments, steps 730 and 735 may be combined into a single transformation.

In step 737, rendering pipeline RP(K) may assemble the vertices to form primitives such as triangles, lines, etc.

In step 740, rendering pipeline RP(K) may perform a clipping computation on each primitive. In clipping space, the vertices of primitives may be represented as 4-tuples (X,Y,Z,W). In some embodiments, the clipping computation may be implemented by performing a series of inequality tests as follows:

$$T1=(-W \leq X)$$

$$T2=(X \leq W)$$

$$T3=(-W \leq Y)$$

$$T4=(Y \leq W)$$

$$T5=(-W \leq Z)$$

$$T6=(Z \leq 0)$$

If all the test flags are true, a vertex resides inside the canonical view volume. If any of the test flags are false, the vertex is outside the canonical view volume. An edge between vertices A and B is inside the canonical view volume if both vertices are inside the canonical view volume. An edge can be trivially rejected if the expression Tk(A) OR Tk(B) is false for any k in the range from one to six. Otherwise, the edge requires testing to determine if it partially intersects the canonical view volume, and if so, to determine the points of intersection of the edge with the clipping planes. A primitive may thus be cut down to one or more interior sub-primitives (i.e. subprimitives that lie inside the canonical view volume). The rendering pipeline RP(K) may compute color intensity values for the new vertices generated by clipping.

Note that the example given above for performing the clipping computation is not meant to be limiting. Other methods may be used for performing the clipping computation.

In step 745, rendering pipeline RP(K) may perform a perspective divide computation on the homogenous post-clipping vertices (X,Y,Z,W) according to the relations $$x=X/W$$

$$y=Y/W$$

$$z=Z/W.$$

After the perspective divide, the x and y coordinates of each vertex (x,y,z) may reside in a viewport rectangle, for example, a viewport square defined by the inequalities $-1 \leq x \leq 1$ and $-1 \leq y \leq 1$.

In step 750, the rendering pipeline RP(K) may perform a render scale transformation on the post-clipping primitives. The render scale transformation may operate on the x and y coordinates of vertices, and may have the effect of mapping the viewport square in perspective-divided space onto (or into) the spatial bin array in virtual screen space, i.e., onto (or into) a rectangle whose width equals the array horizontal bin resolution $M_B$ and whose height equals the array vertical bin resolution $N_B$. Let $X_v$ and $Y_v$ denote the horizontal and vertical coordinate respectively in the virtual screen space.

Figure 5:
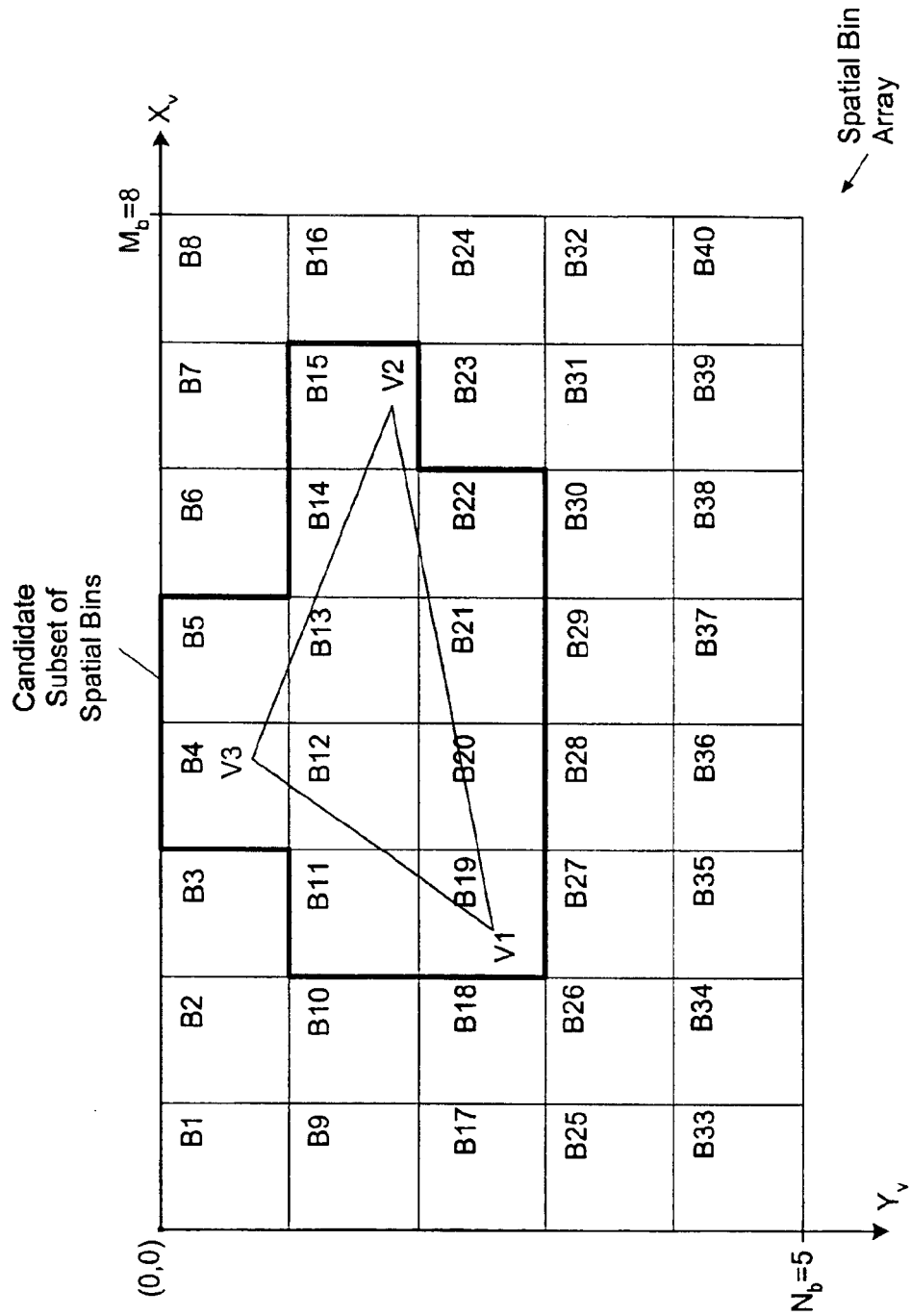
FIG. 5 illustrates a set of candidate bins which intersect a particular triangle.

In step 755, the rendering pipeline RP(K) may identify spatial bins which geometrically intersect with the post-scaling primitive as suggested by FIG. 5. Bins in this subset are referred to as "candidate" bins or "intersecting" bins. It is noted that values $M_B=8$ and $N_B=5$ for the dimensions of the spatial bin array have been chosen for sake of illustration, and are much smaller than would typically be used in most applications of graphics system 100.

Figure 6:
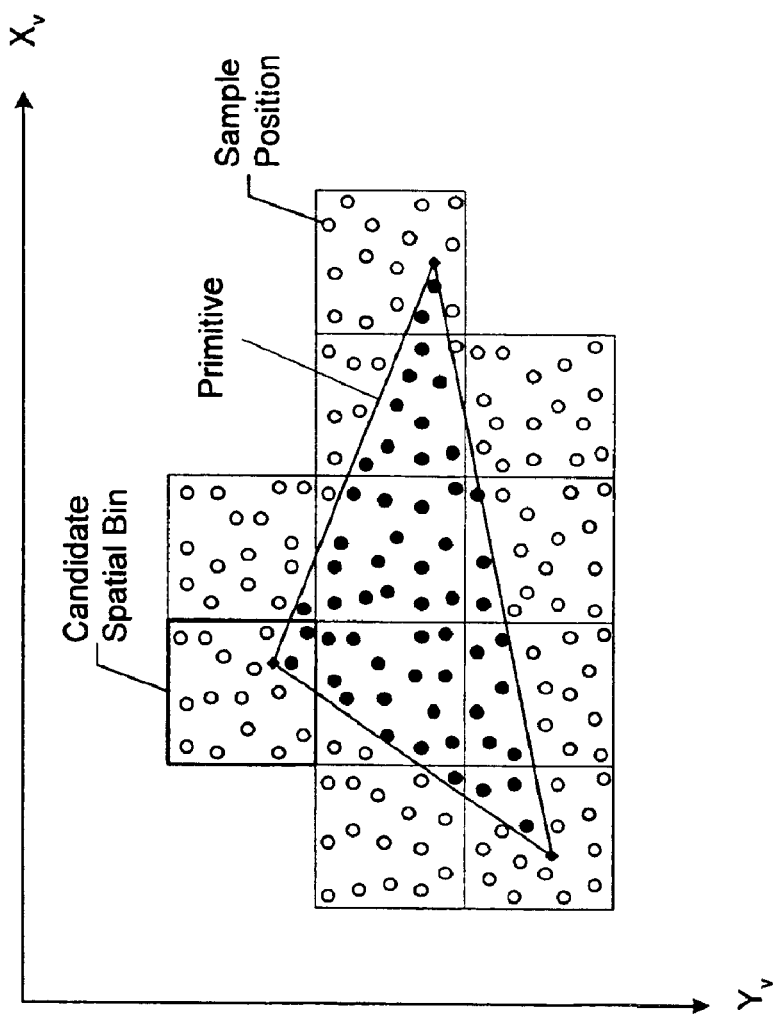
FIG. 6 illustrates the identification of sample positions in the candidate bins which fall interior to the triangle.

In step 760, the rendering pipeline RP(K) performs a "sample fill" operation on candidate bins identified in step 755 as suggested by FIG. 6. In the sample fill operation, the rendering pipeline RP(K) populates candidate bins with sample positions, identifies which of the sample positions reside interior to the primitive, and computes sample values (such as red, green, blue, z and alpha) at each of the interior sample positions. The rendering pipeline RP(K) may include a plurality of sample fill units to parallelize the sample fill computation. For example, two sample fill units may perform the sample fill operation in parallel on two candidate bins respectively. (This N=2 example generalizes to any number of parallel sample fill units). In FIG. 6, interior sample positions are denoted as small black dots, and exterior sample positions are denoted as small circles.

Figure 7:
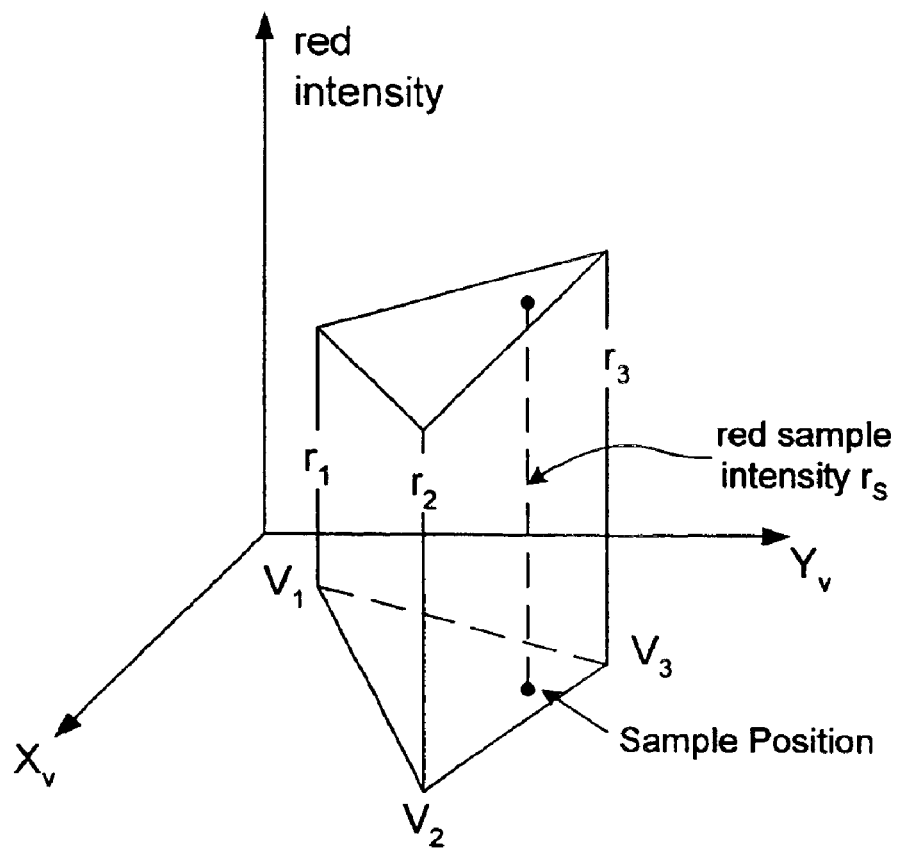
FIG. 7 illustrates the computation of a red sample component based on a spatial interpolation of the red components at the vertices of the containing triangle.

The rendering pipeline RP(K) may compute the color components (r,g,b) for each interior sample position in a candidate bin based on a spatial interpolation of the corresponding vertex color components as suggested by FIG. 7. FIG. 7 suggests a linear interpolation of a red intensity value rs for a sample position inside the triangle defined by the vertices V1, V2, and V3 in virtual screen space (i.e. the horizontal plane of the figure). The red color intensity is shown as the up-down coordinate. Each vertex Vk has a corresponding red intensity value $r_k$. Similar interpolations may be performed to determine green, blue, z and alpha values.

In step 765, rendering pipeline RP(K) may compute a vector of texture values for each candidate bin. The rendering pipeline RP(K) may couple to a corresponding texture memory TM(K). The texture memory TM(K) may be used to store one or more layers of texture information. Rendering pipeline RP(K) may use texture coordinates associated with a candidate bin to read texels from the texture memory TM(K). The texels may be filtered to generate the vector of texture values. The rendering pipeline RP(K) may include a plurality of texture filtering units to parallelize the computation of texture values for one or more candidate bins.

The rendering pipeline RP(K) may include a sample fill pipeline which implements step 760 and a texture pipeline which implements step 765. The sample fill pipeline and the texture pipeline may be configured for parallel operation. The sample fill pipeline may perform the sample fill operations on one or more candidate bins while the texture fill pipeline computes the texture values for the one or more candidate bins.

In step 770, the rendering pipeline RP(K) may apply the one or more texture values corresponding to each candidate bin to the color vectors of the interior samples in the candidate bin. Any of a variety of methods may be used to apply the texture values to the sample color vectors.

In step 775, the rendering pipeline RP(K) may forward the computed samples to the scheduling network 400 for storage in the sample buffer 500.

The sample buffer 500 may be configured to support double-buffered operation. The sample buffer may be logically partitioned into two buffer segments A and B. The rendering engine 300 may write into buffer segment A while the filtering engine 600 reads from buffer segment B. At the end of a frame of animation, a host application (running on a host computer) may assert a buffer swap command. In response to the buffer swap command, control of buffer segment A may be transferred to the filtering engine 600, and control of buffer segment B may be transferred to rendering engine 300. Thus, the rendering engine 300 may start writing samples into buffer segment B, and the filtering engine 600 may start reading samples from buffer segment A.

It is noted that usage of the term "double-buffered" does not necessarily imply that all components of samples are double-buffered in the sample buffer 500. For example, sample color may be double-buffered while other components such as z depth may be single-buffered.

In some embodiments, the sample buffer 500 may be triple-buffered or N-fold buffered, where N is greater than two.

Filtration of Samples to Determine Pixels

Filtering engine 600 may access samples from a buffer segment (A or B) of the sample buffer 500, and generate video pixels from the samples. Each buffer segment of sample buffer 500 may be configured to store an $M_B \times N_B$ array of bins. Each bin may store $N_{s/b}$ samples. The values $M_B$, $N_B$ and $N_{s/b}$ are programmable parameters.

Figure 8:
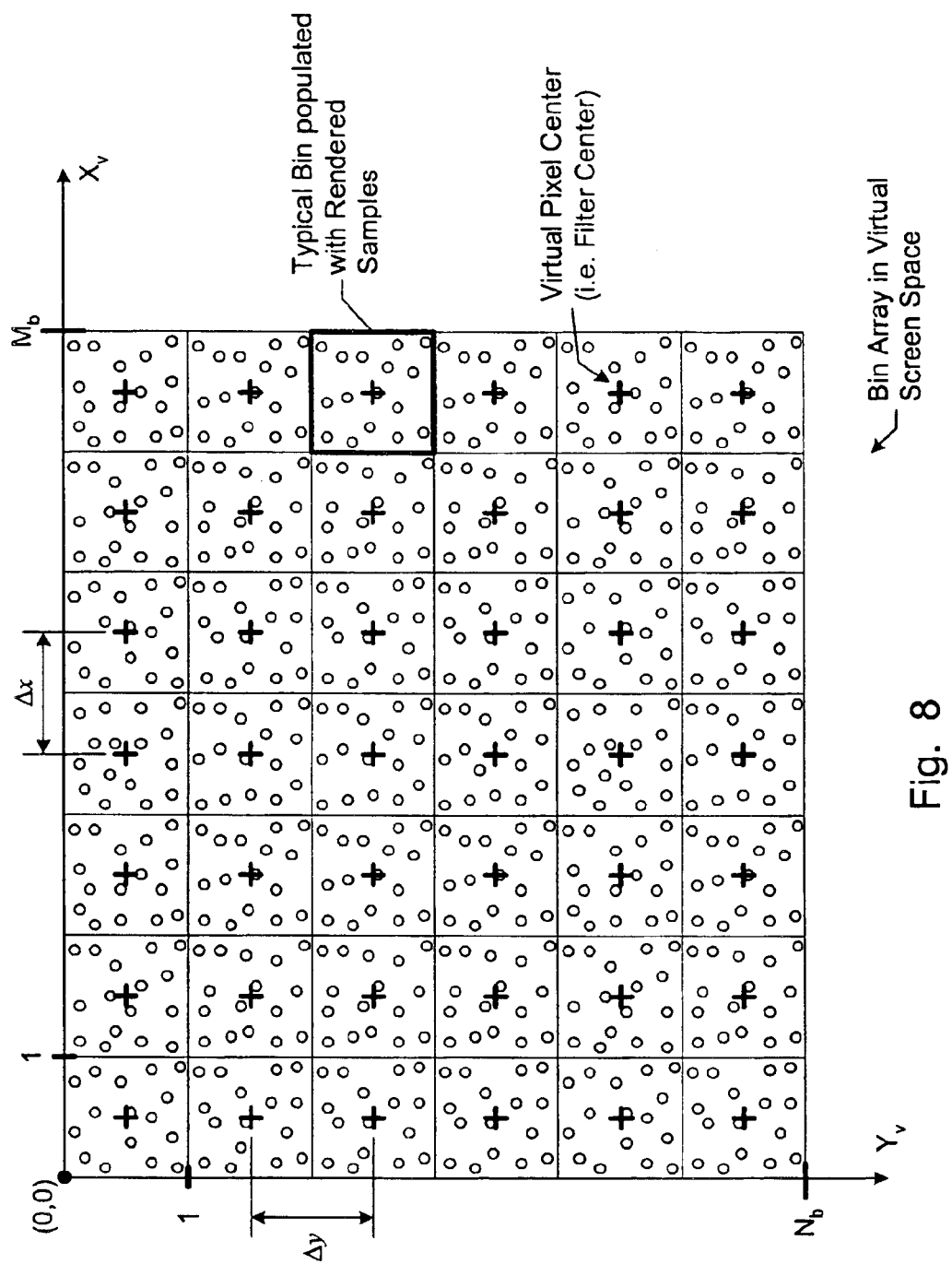
FIG. 8 illustrates an array of virtual pixel positions distributed in the virtual screen space and superimposed on top of the array of spatial bins.

As suggested by FIG. 8, filtering engine 600 may scan through virtual screen space in raster fashion generating virtual pixel positions denoted by the small plus markers, and generating a video pixel at each of the virtual pixel positions based on the samples (small circles) in the neighborhood of the virtual pixel position. The virtual pixel positions are also referred to herein as filter centers (or kernel centers) since the video pixels are computed by means of a filtering of samples. The virtual pixel positions form an array with horizontal displacement $\Delta X$ between successive virtual pixel positions in a row and vertical displacement $\Delta Y$ between successive rows. The first virtual pixel position in the first row is controlled by a start position $(X_{start}, Y_{start})$. The horizontal displacement $\Delta X$, vertical displacement $\Delta Y$ and the start coordinates $X_{start}$ and $Y_{start}$ are programmable parameters.

FIG. 8 illustrates a virtual pixel position at the center of each bin. However, this arrangement of the virtual pixel positions (at the centers of render pixels) is a special case. More generally, the horizontal displacement $\Delta x$ and vertical displacement $\Delta y$ may be assigned values greater than or less than one. Furthermore, the start position $(X_{start}, Y_{start})$ is not constrained to lie at the center of a spatial bin. Thus, the vertical resolution $N_P$ of the array of virtual pixel centers may be different from $N_B$, and the horizontal resolution $M_P$ of the array of virtual pixel centers may be different from $M_B$.

Figure 9:
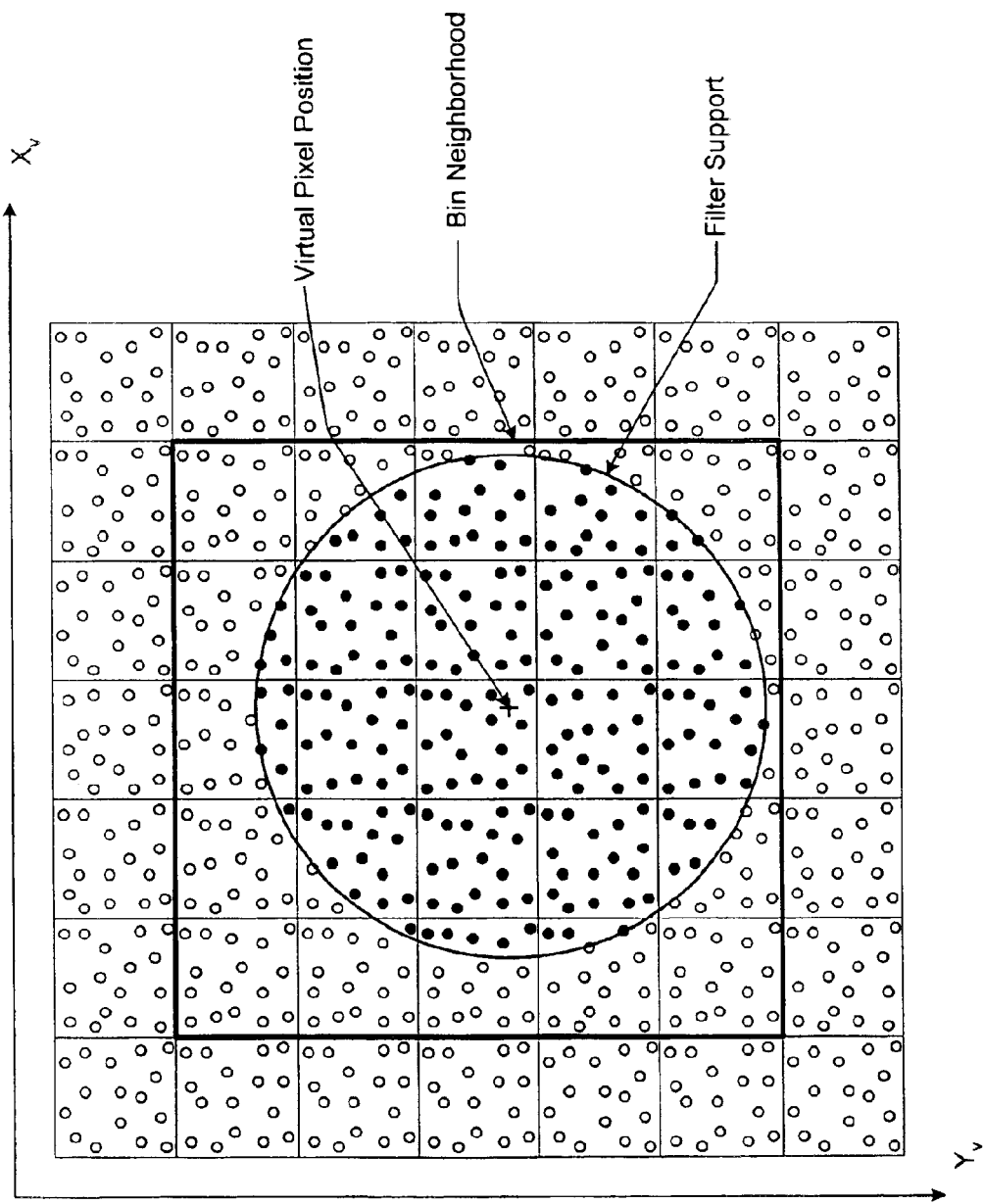
FIG. 9 illustrates the computation of a pixel at a virtual pixel position (denoted by the plus marker) according to one set of embodiments.

The filtering engine 600 may compute a video pixel at a particular virtual pixel position as suggested by FIG. 9. The filtering engine 600 may compute the video pixel based on a filtration of the samples falling within a support region centered on (or defined by) the virtual pixel position. Each sample S falling within the support region may be assigned a filter coefficient $C_S$ based on the sample's position (or some function of the sample's radial distance) with respect to the virtual pixel position.

Each of the color components of the video pixel may be determined by computing a weighted sum of the corresponding sample color components for the samples falling inside the filter support region. For example, the filtering engine 600 may compute an initial red value $r_P$ for the video pixel P according to the expression:

$$r_P = \Sigma C_S r_S,$$

where the summation ranges over each sample S in the filter support region, and where $r_s$ is the red sample value of the sample S. In other words, the filtering engine 600 may multiply the red component of each sample S in the filter support region by the corresponding filter coefficient $C_S$, and add up the products. Similar weighted summations may be performed to determine an initial green value $g_P$, an initial blue value $b_P$, and optionally, an initial alpha value $\alpha_P$ for the video pixel P based on the corresponding components of the samples.

Furthermore, the filtering engine 600 may compute a normalization value E by adding up the filter coefficients $C_S$ for the samples S in the bin neighborhood, i.e., $$E = \Sigma C_S$$

The initial pixel values may then be multiplied by the reciprocal of E (or equivalently, divided by E) to determine normalized pixel values:

$$R_P = (1/E) * r_P$$
$$G_P = (1/E) * g_P$$
$$B_P = (1/E) * b_P$$
$$A_P = (1/E) * \alpha_P.$$

In one set of embodiments, the filter coefficient $C_S$ for each sample S in the filter support region may be determined by a table lookup. For example, a radially symmetric filter may be realized by a filter coefficient table, which is addressed by a function of a sample's radial distance with respect to the virtual pixel center. The filter support for a radially symmetric filter may be a circular disk as suggested by the example of FIG. 9. The support of a filter is the region in virtual screen space on which the filter is defined. The terms "filter" and "kernel" are used as synonyms herein. Let $R_f$ denote the radius of the circular support disk.

The filtering engine 600 may examine each sample S in a neighborhood of bins containing the filter support region. The bin neighborhood may be a rectangle (or square) of bins. For example, in one embodiment the bin neighborhood is a 5×5 array of bins centered on the bin which contains the virtual pixel position.

The filtering engine 600 may compute the square radius $(D_S)^2$ of each sample position $(X_S, Y_S)$ in the bin neighborhood with respect to the virtual pixel position $(X_P, Y_P)$ according to the expression $$(D_S)^2 = (X_S - X_P)^2 + (Y_S - Y_P)^2.$$

The square radius $(D_S)^2$ may be compared to the square radius $(R_f)^2$ of the filter support. If the sample's square radius is less than (or, in a different embodiment, less than or equal to) the filter's square radius, the sample S may be marked as being valid (i.e., inside the filter support). Otherwise, the sample S may be marked as invalid.

The filtering engine 600 may compute a normalized square radius Us for each valid sample S by multiplying the sample's square radius by the reciprocal of the filter's square radius:

$$U_S = (D_S)^2 \frac{1}{(R_f)^2}.$$

The normalized square radius Us may be used to access the filter coefficient table for the filter coefficient $C_S$. The filter coefficient table may store filter weights indexed by the normalized square radius.

In various embodiments, the filter coefficient table is implemented in RAM and is programmable by host software. Thus, the filter function (i.e. the filter kernel) used in the filtering process may be changed as needed or desired. Similarly, the square radius $(R_f)^2$ of the filter support and the reciprocal square radius $1/(R_f)^2$ of the filter support may be programmable.

Because the entries in the filter coefficient table are indexed according to normalized square distance, they need not be updated when the radius $R_f$ of the filter support changes. The filter coefficients and the filter radius may be modified independently.

In one embodiment, the filter coefficient table may be addressed with the sample radius $D_S$ at the expense of computing a square root of the square radius $(D_S)^2$. In another embodiment, the square radius may be converted into a floating-point format, and the floating-point square radius may be used to address the filter coefficient table. It is noted that the filter coefficient table may be indexed by any of various radial distance measures. For example, an $L^1$ norm or $L^{infinity}$ norm may be used to measure the distance between a sample position and the virtual pixel center.

Invalid samples may be assigned the value zero for their filter coefficients. Thus, the invalid samples end up making a null contribution to the pixel value summations. In other embodiments, filtering hardware internal to the filtering engine may be configured to ignore invalid samples. Thus, in these embodiments, it is not necessary to assign filter coefficients to the invalid samples.

In some embodiments, the filtering engine 600 may support multiple filtering modes. For example, in one collection of embodiments, the filtering engine 600 supports a box filtering mode as well as a radially symmetric filtering mode. In the box filtering mode, filtering engine 600 may implement a box filter over a rectangular support region, e.g., a square support region with radius $R_f$ (i.e. side length $2R_f$). Thus, the filtering engine 600 may compute boundary coordinates for the support square according to the expressions $X_P + R_f$, $X_P - R_f$, $Y_P + R_f$, and $Y_P - R_f$. Each sample S in the bin neighborhood may be marked as being valid if the sample's position $(X_S, Y_S)$ falls within the support square, i.e., if $$X_P - R_f < X_S < X_P + R_f \text{ and}$$
$$Y_P - R_f < Y_S < Y_P + R_f.$$

Otherwise the sample S may be marked as invalid. Each valid sample may be assigned the same filter weight value (e.g., $C_S = 1$). It is noted that any or all of the strict inequalities (<) in the system above may be replaced with permissive inequalities ($\leq$). Various embodiments along these lines are contemplated.

The filtering engine 600 may use any of a variety of filters either alone or in combination to compute pixel values from sample values. For example, the filtering engine 600 may use a box filter, a tent filter, a cone filter, a cylinder filter, a Gaussian filter, a Catmull-Rom filter, a Mitchell-Netravali filter, a windowed sinc filter, or in general, any form of band pass filter or any of various approximations to the sinc filter.

In one set of embodiments, the filtering engine 600 may include a set of filtering units FU(0), FU(1), FU(2), ..., FU($N_f$–1) operating in parallel, where the number $N_f$ of filtering units is a positive integer. For example, in one embodiment, $N_f$=4. In another embodiment, $N_f$=8.

The filtering units may be configured to partition the effort of generating each frame (or field of video). A frame of video may comprise an $M_P \times N_P$ array of pixels, where $M_P$ denotes the number of pixels per line, and $N_P$ denotes the number of lines. Each filtering unit FU(K) may be configured to generate a corresponding subset of the pixels in the $M_P \times N_P$ pixel array. For example, in the $N_f$=4 case, the pixel array may be partitioned into four vertical stripes, and each filtering unit FU(K), K=0, 1, 2, 3, may be configured to generate the pixels of the corresponding stripe.

Filtering unit FU(K) may include a system of digital circuits, which implement the processing loop suggested below. The values $X_{start}(K)$ and $Y_{start}(K)$ represent the start position for the first (e.g. top-left) virtual pixel center in the $K^{th}$ stripe of virtual pixel centers. The values $\Delta X(K)$ and $\Delta Y(K)$ represent respectively the horizontal and vertical step size between virtual pixel centers in the $K^{th}$ stripe. The value $M_H(K)$ represents the number of pixels horizontally in the $K^{th}$ stripe. For example, if there are four stripes ($N_f$=4) with equal width, $M_H(K)$ may be set equal to $M_P/4$ for K=0, 1, 2, 3. Filtering unit FU(K) may generate a stripe of pixels in a scan line fashion as follows:

```
I=0;
J=0;
X_p=X_start(K);
Y_p=Y_start(K);
while (J<N_p) {
    while (I <M_H(K) {
        Pixel Values = Filtration(X_p,Y_p);
        Send PixelValues to Output Buffer;
        X_p = X_p+ΔX(K);
        I = I + 1;
    }
    X_p=X_start(K)
    Y_p=Y_p+ΔY(K);
    J=J+1;
}
```

The expression Filtration($X_P$, $Y_P$) represents the filtration of samples in the bin filter support region of the current virtual pixel position ($X_P$, $Y_P$) to determine the components (e.g. RGB values, and optionally, an alpha value) of the current pixel as described above. Once computed, the pixel values may be sent to an output buffer for merging into a video stream. The inner loop generates successive virtual pixel positions within a single row of the stripe. The outer loop generates successive rows. The above fragment may be executed once per video frame (or field). Filtering unit FU(K) may include registers for programming the values $X_{start}(K)$, $Y_{start}(K)$, $\Delta X(K)$, $\Delta Y(K)$, and $M_H(K)$. These values are dynamically adjustable from host software. Thus, the graphics system 100 may be configured to support arbitrary video formats.

Figure 10:
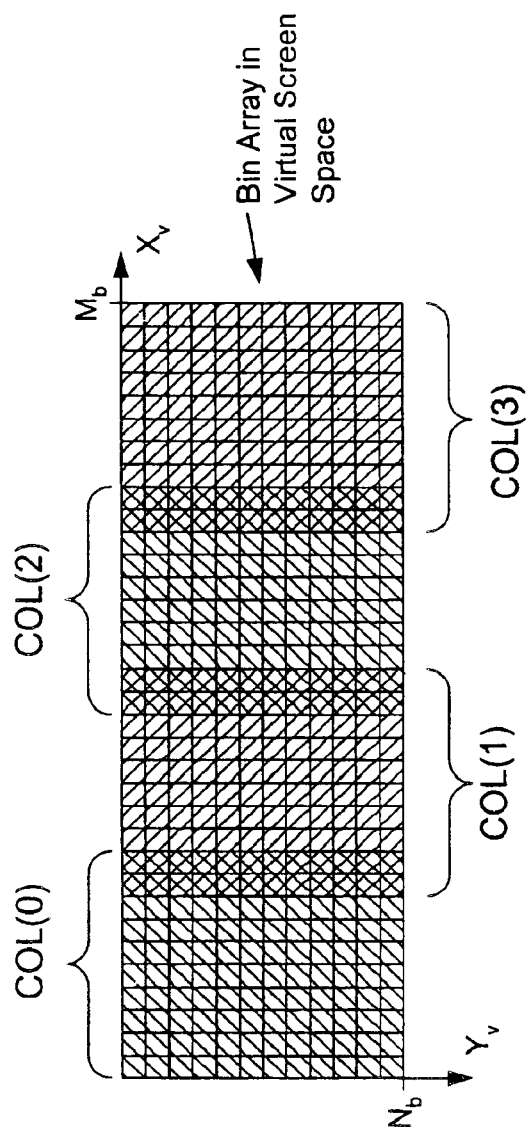
FIG. 10 illustrates a set of columns in the spatial bin array, wherein the $K^{th}$ column defines the subset of memory bins (from the sample buffer) which are used by a corresponding filtering unit FU(K) of the filtering engine.

Each filtering unit FU(K) accesses a corresponding subset of bins from the sample buffer 500 to generate the pixels of the $K^{th}$ stripe. For example, each filtering unit FU(K) may access bins corresponding to a column COL(K) of the bin array in virtual screen space as suggested by FIG. 10. Each column may be a rectangular subarray of bins. Note that column COL(K) may overlap with adjacent columns. This is a result of using a filter function with filter support that covers more than one spatial bin. Thus, the amount of overlap between adjacent columns may depend on the radius of the filter support.

Figure 11:
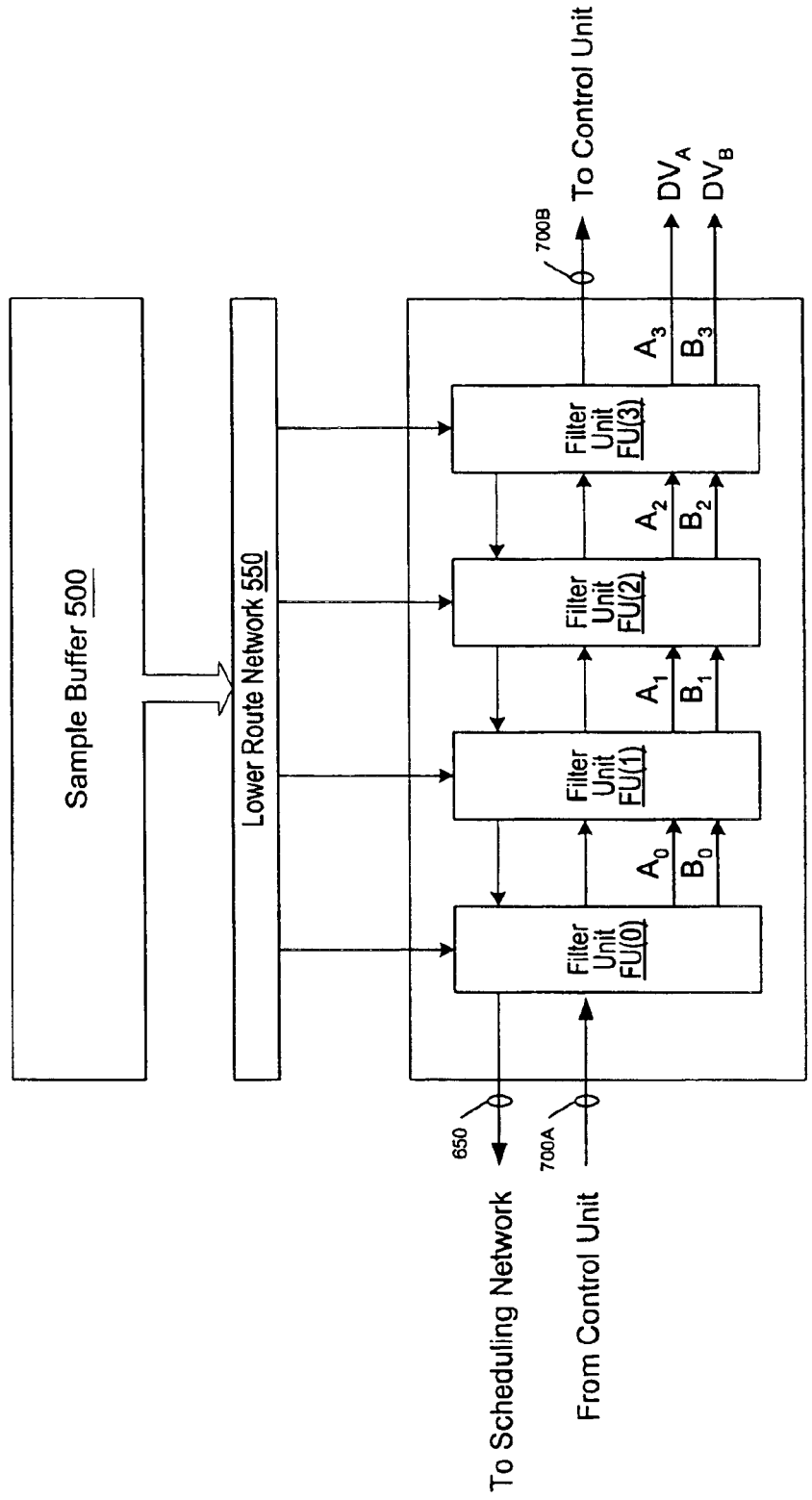
FIG. 11 illustrates one set of embodiments of filtering engine 600.

The filtering units may be coupled together in a linear succession as suggested by FIG. 11 in the case $N_f$=4. Except for the first filtering unit FU(0) and the last filtering unit FU($N_f$–1), each filtering unit FU(K) may be configured to receive digital video input streams $A_{K-1}$ and $B_{K-1}$ from a previous filtering unit FU(K–1), and to transmit digital video output streams $A_K$ and $B_K$ to the next filtering unit FU(K+1). The first filtering unit FU(0) generates video streams $A_0$ and $B_0$ and transmits these streams to filtering unit FU(1). The last filtering unit FU($N_f$–2) receives digital video streams $A_{Nf-2}$ and $B_{Nf-2}$ from the previous filtering unit FU($N_f$–2), and generates digital video output streams $A_{Nf-1}$ and $B_{Nf-1}$ also referred to as video streams $DV_A$ and $DV_B$ respectively. Video streams $A_0, A_1, \ldots, A_{Nf-1}$ are said to belong to video stream A. Similarly, video streams $B_0, B_1, \ldots, B_{Nf-1}$ are said to belong to video stream B.

Each filtering unit FU(K) may be programmed to mix (or substitute) its computed pixel values into either video stream A or video stream B. For example, if the filtering unit FU(K) is assigned to video stream A, the filtering unit FU(K) may mix (or substitute) its computed pixel values into video stream A, and pass video stream B unmodified to the next filtering unit FU(K+1). In other words, the filtering unit FU(K) may mix (or replace) at least a subset of the dummy pixel values present in video stream $A_{K-1}$ with its locally computed pixel values. The resultant video stream $A_K$ is transmitted to the next filtering unit. The first filtering unit FU(0) may generate video streams $A_{-1}$ and $B_{-1}$ containing dummy pixels (e.g., pixels having a background color), and mix (or substitute) its computed pixel values into either video stream $A_{-1}$, or $B_{-1}$, and pass the resulting streams $A_0$ and $B_0$ to the filtering unit FU(1). Thus, the video streams A and B mature into complete video signals as they are operated on by the linear succession of filtering units.

The filtering unit FU(K) may also be configured with one or more of the following features: color look-up using pseudo color tables, direct color, inverse gamma correction, and conversion of pixels to non-linear light space. Other features may include programmable video timing generators, programmable pixel clock synthesizers, cursor generators, and crossbar functions.

While much of the present discussion has focused on the case where $N_f$=4, it is noted that the inventive principles described in this special case naturally generalize to arbitrary values for the parameter $N_f$ (the number of filtering units).

Figure 12:
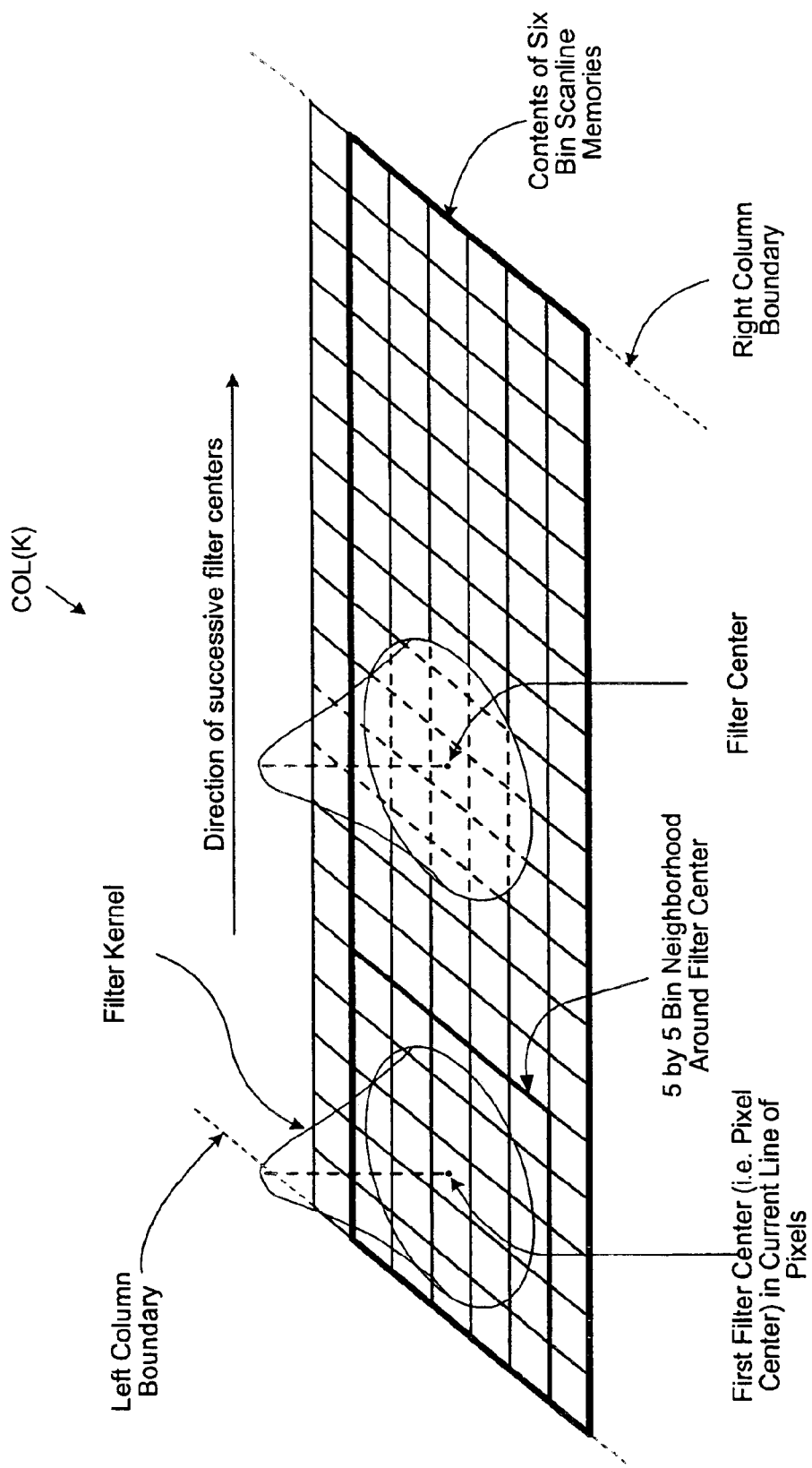
FIG. 12 illustrates one embodiment of a computation of pixels at successive filter center (i.e. virtual pixel centers) across a bin column.

In one set of embodiments, each filtering unit FU(K) may include (or couple to) a plurality of bin scanline memories (BSMs). Each bin scanline memory may contain sufficient capacity to store a horizontal line of bins within the corresponding column COL(K). For example, in some embodiments, filtering unit FU(K) may include six bin scanline memories as suggested by FIG. 12.

Filtering unit FU(K) may move the filter centers through the column COL(K) in a raster fashion, and generate a pixel at each filter center. The bin scanline memories may be used to provide fast access to the memory bins used for a line of pixel centers. As the filtering unit FU(K) may use samples in a 5 by 5 neighborhood of bins around a pixel center to compute a pixel, successive pixels in a line of pixels end up using a horizontal band of bins that spans the column and measures five bins vertically. Five of the bin scan lines memories may store the bins of the current horizontal band.

The sixth bin scan line memory may store the next line of bins, after the current band of five, so that the filtering unit FU(K) may immediately begin computation of pixels at the next line of pixel centers when it reaches the end of the current line of pixel centers.

As the vertical displacement $\Delta Y$ between successive lines of virtual pixels centers may be less than the vertical size of a bin, not every vertical step to a new line of pixel centers necessarily implies use of a new line of bins. Thus, a vertical step to a new line of pixel centers will be referred to as a nontrivial drop down when it implies the need for a new line of bins. Each time the filtering unit FU(K) makes a nontrivial drop down to a new line of pixel centers, one of the bin scan line memories may be loaded with a line of bins in anticipation of the next nontrivial drop down.

Much of the above discussion has focused on the use of six bin scanline memories in each filtering unit. However, more generally, the number of bin scanline memories may be one larger than the diameter (or side length) of the bin neighborhood used for the computation of a single pixel. (For example, in an alternative embodiment, the bin neighborhood may be a 7×7 array of bins.)

Furthermore, each of the filtering units FU(K) may include a bin cache array to store the memory bins that are immediately involved in a pixel computation. For example, in some embodiments, each filtering unit FU(K) may include a 5×5 bin cache array, which stores the 5×5 neighborhood of bins that are used in the computation of a single pixel. The bin cache array may be loaded from the bin scanline memories.

As noted above, each rendering pipeline of the rendering engine 300 generates sample positions in the process of rendering primitives. Sample positions within a given spatial bin may be generated by adding a vector displacement $(\Delta X, \Delta Y)$ to the vector position $(X_{bin}, Y_{bin})$ of the bin's origin (e.g. the top-left corner of the bin). To generate a set of sample positions within a spatial bin implies adding a corresponding set of vector displacements to the bin origin. To facilitate the generation of sample positions, each rendering pipeline may include a programmable jitter table which stores a collection of vector displacements $(\Delta X, \Delta Y)$. The jitter table may have sufficient capacity to store vector displacements for an $M_J \times N_J$ tile of bins. Assuming a maximum sample position density of $D_{max}$ samples per bin, the jitter table may then store $M_J * N_J * D_{max}$ vector displacements to support the tile of bins. Host software may load the jitter table with a pseudo-random pattern of vector displacements to induce a pseudo-random pattern of sample positions. In one embodiment, $M_J = N_J = 2$ and $D_{max} = 16$.

A straightforward application of the jitter table may result in a sample position pattern, which repeats with a horizontal period equal to $M_J$ bins, and a vertical period equal to $N_J$ bins. However, in order to generate more apparent randomness in the pattern of sample positions, each rendering engine may also include a permutation circuit, which applies transformations to the address bits going into the jitter table and/or transformations to the vector displacements coming out of the jitter table. The transformations depend on the bin horizontal address $X_{bin}$ and the bin vertical address $Y_{bin}$.

Each rendering unit may employ such a jitter table and permutation circuit to generate sample positions. The sample positions are used to compute samples, and the samples are written into sample buffer 500. Each filtering unit of the filtering engine 600 reads samples from sample buffer 500, and may filter the samples to generate pixels. Each filtering unit may include a copy of the jitter table and permutation circuit, and thus, may reconstruct the sample positions for the samples it receives from the sample buffer 500, i.e., the same sample positions that are used to compute the samples in the rendering pipelines. Thus, the sample positions need not be stored in sample buffer 500.

As noted above, sample buffer 500 stores the samples, which are generated by the rendering pipelines and used by the filtering engine 600 to generate pixels. The sample buffer 500 may include an array of memory devices, e.g., memory devices such as SRAMs, SDRAMs, RDRAMs, 3DRAMs or 3DRAM64s. In one collection of embodiments, the memory devices are 3DRAM64 devices manufactured by Mitsubishi Electric Corporation.

RAM is an acronym for random access memory.

SRAM is an acronym for static random access memory.

DRAM is an acronym for dynamic random access memory.

SDRAM is an acronym for synchronous dynamic random access memory.

RDRAM is an acronym for Rambus DRAM.

The memory devices of the sample buffer may be organized into NMB memory banks denoted MB(0), MB(1), MB(2), . . . , MB($N_{MB}$-1), where NMB is a positive integer. For example, in one embodiment, NMB equals eight. In another embodiment, NMB equals sixteen.

Each memory bank MB may include a number of memory devices. For example, in some embodiments, each memory bank includes four memory devices.

Each memory device stores an array of data items. Each data item may have sufficient capacity to store sample color in a double-buffered fashion, and other sample components such as z depth in a single-buffered fashion. For example, in one set of embodiments, each data item may include 116 bits of sample data defined as follows:

30 bits of sample color (for front buffer),
30 bits of sample color (for back buffer),
16 bits of alpha and/or overlay,
10 bits of window ID,
26 bits of z depth, and
4 bits of stencil.

Each of the memory devices may include one or more pixel processors, referred to herein as memory-integrated pixel processors. The 3DRAM and 3DRAM64 memory devices manufactured by Mitsubishi Electric Corporation have such memory-integrated pixel processors. The memory-integrated pixel processors may be configured to apply processing operations such as blending, stenciling, and Z buffering to samples. 3DRAM64s are specialized memory devices configured to support internal double-buffering with single buffered Z in one chip.

Figure 13:
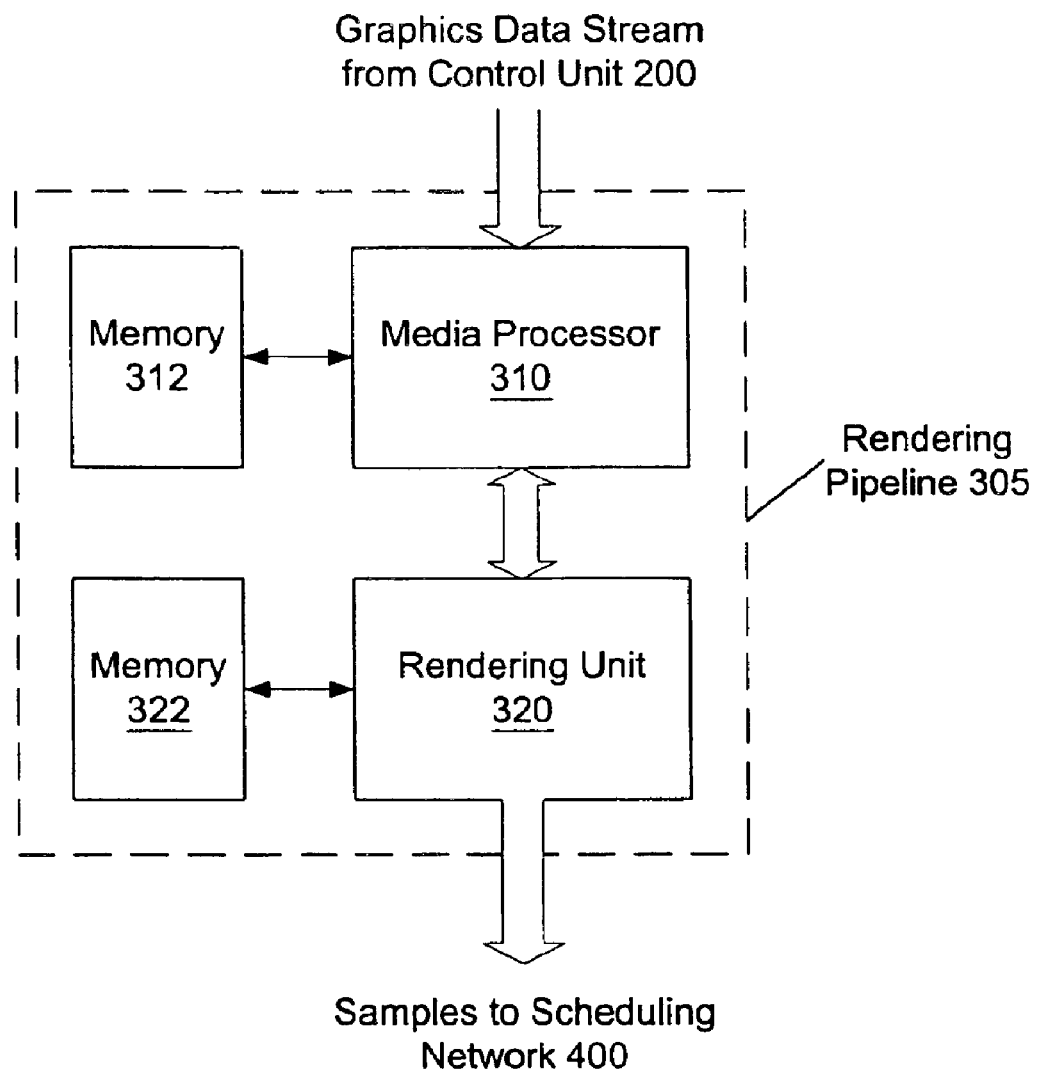
FIG. 13 illustrates one set of embodiments of a rendering pipeline comprising a media processor and a rendering unit.

As described above, the rendering engine 300 may include a set of rendering pipelines RP(0), RP(1), . . . , RP($N_{PL}$-1). FIG. 13 illustrates one embodiment of a rendering pipeline 305 that may be used to implement each of the rendering pipelines RP(0), RP(1), . . . , RP($N_{PL}$-1). The rendering pipeline 305 may include a media processor 310 and a rendering unit 320.

The media processor 310 may operate on a stream of graphics data received from the control unit 200. For example, the media processor 310 may perform the three-dimensional transformation operations and lighting operations such as those indicated by steps 710 through 735 of FIG. 4. The media processor 310 may be configured to support the decompression of compressed geometry data.

The media processor 310 may couple to a memory 312, and may include one or more microprocessor units. The memory 312 may be used to store program instructions and/or data for the microprocessor units. (Memory 312 may also be used to store display lists and/or vertex texture maps.) In one embodiment, memory 312 comprises direct Rambus DRAM (i.e. DRDRAM) devices.

The rendering unit 320 may receive transformed and lit vertices from the media processor, and perform processing operations such as those indicated by steps 737 through 775 of FIG. 4. In one set of embodiments, the rendering unit 320 is an application specific integrated circuit (ASIC). The rendering unit 320 may couple to memory 322 which may be used to store texture information (e.g., one or more layers of textures). Memory 322 may comprise SDRAM (synchronous dynamic random access memory) devices. The rendering unit 310 may send computed samples to sample buffer 500 through scheduling network 400.

Figure 14:
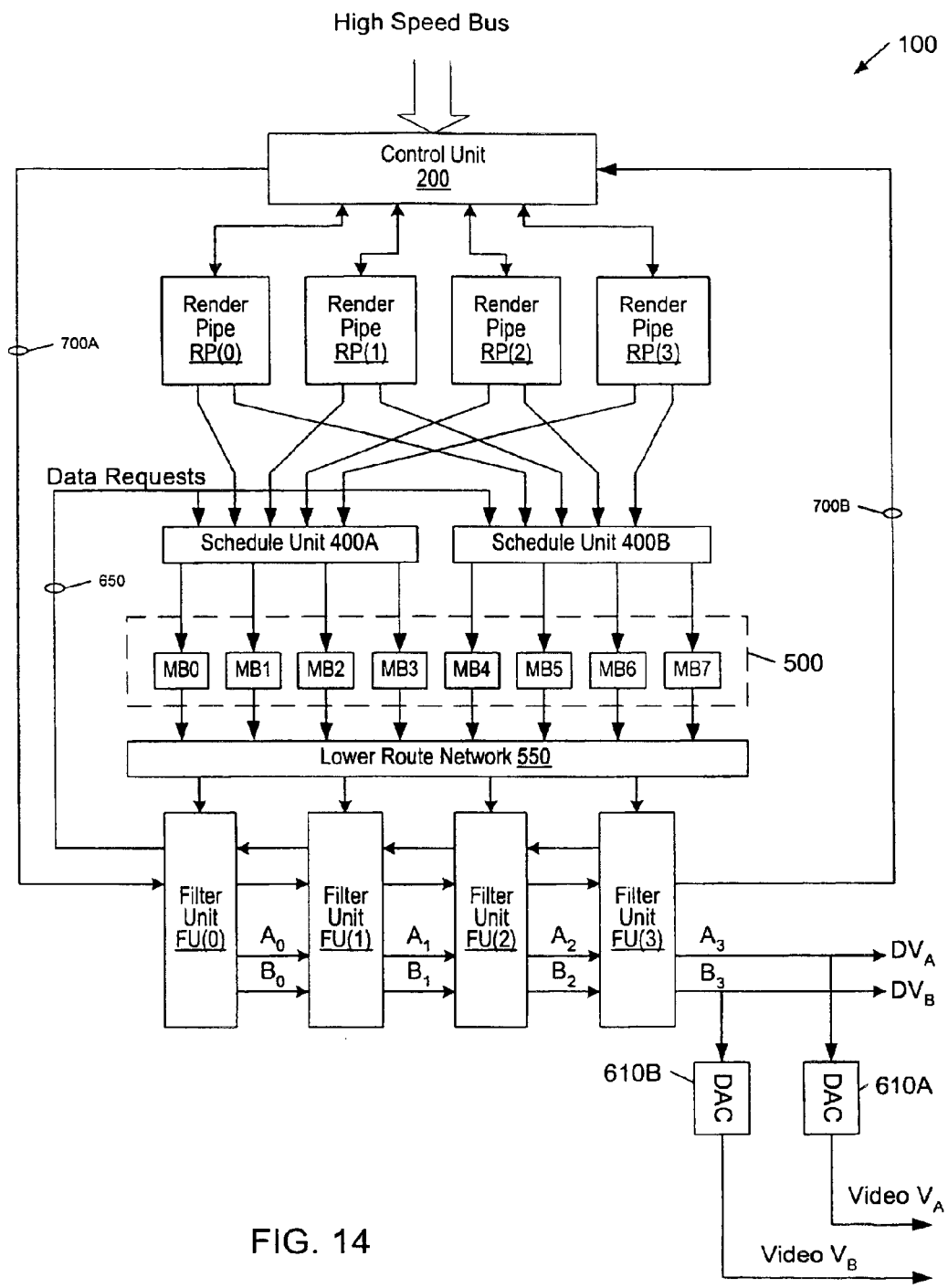
FIG. 14 illustrates one embodiment of graphics accelerator 100.

FIG. 14 illustrates one embodiment of the graphics accelerator 100. In this embodiment, the rendering engine 300 includes four rendering pipelines RP(0) through RP(3), scheduling network 400 includes two schedule units 400A and 400B, sample buffer 500 includes eight memory banks MB(0) through MB(7), and filtering engine 600 includes four filtering units FU(0) through FU(3). The filtering units may generate two digital video streams $DV_A$ and $DV_B$. The digital video streams $DV_A$ and $DV_B$ may be supplied to digital-to-analog converters (DACs) 610A and 610B, where they are converted into analog video signals $V_A$ and $V_B$ respectively. The analog video signals are supplied to video output ports. In addition, the graphics system 100 may include one or more video encoders. For example, the graphics system 100 may include an S-video encoder.

Figure 15:
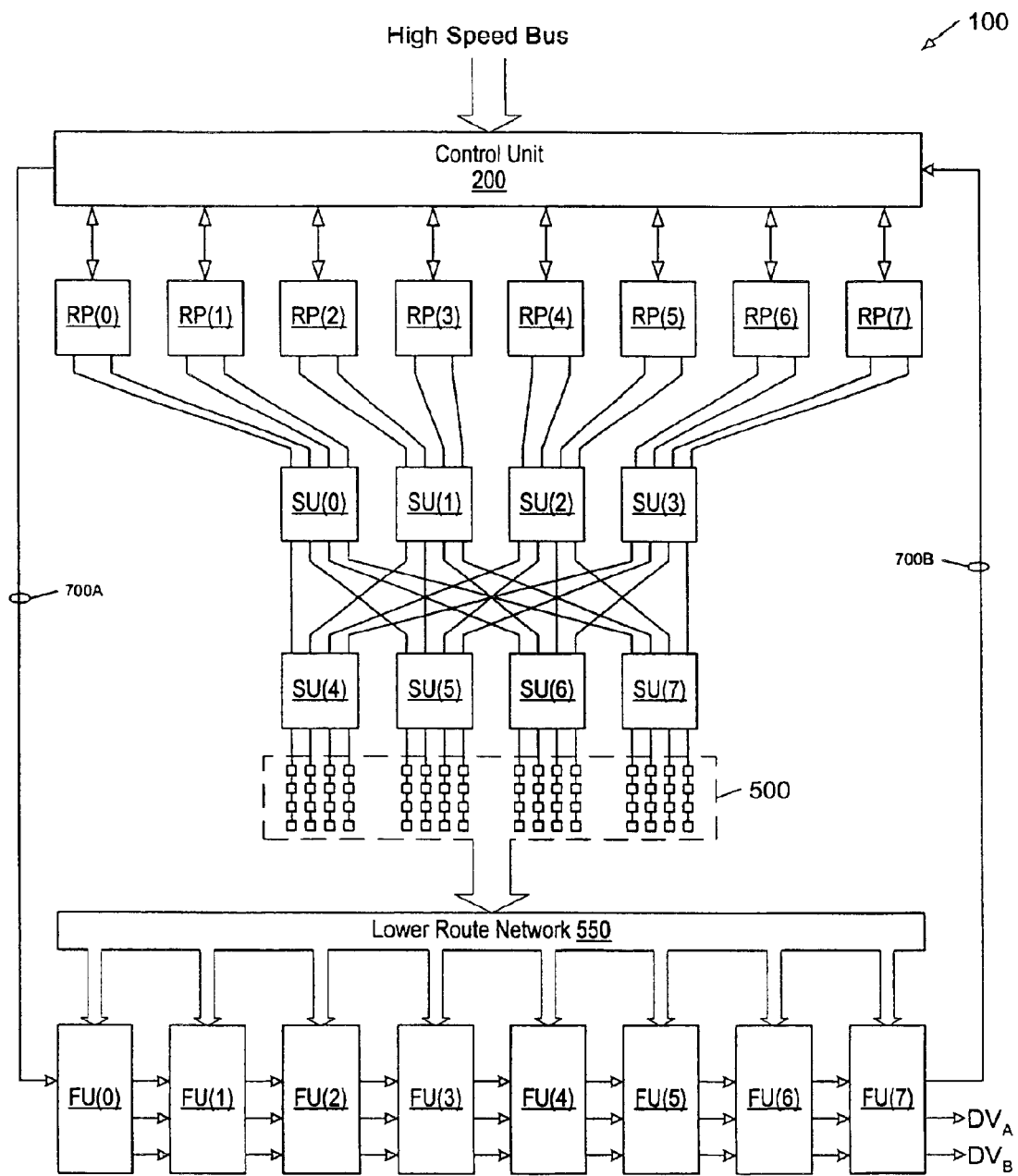
FIG. 15 illustrates another embodiment of graphics accelerator 100.

FIG. 15 illustrates another embodiment of graphics system 100. In this embodiment, the rendering engine 300 includes eight rendering pipelines RP(0) through RP(7), the scheduling network 400 includes eight schedule units SU(0) through SU(7), the sample buffer 500 includes sixteen memory banks, the filtering engine 600 includes eight filtering units FU(0) through FU(7). This embodiment of graphics system 100 also includes DACs to convert the digital video streams DVA and DVB into analog video signals.

Observe that the schedule units are organized as two layers. The rendering pipelines couple to the first layer of schedule unit SU(0) through SU(3). The first layer of schedule units couple to the second layer of schedule units SU(4) through SU(7). Each of the schedule units in the second layer couples to four banks of memory device in sample buffer 500.

The embodiments illustrated in FIGS. 14 and 15 are meant to suggest a vast ensemble of embodiments that are obtainable by varying design parameters such as the number of rendering pipelines, the number of schedule units, the number of memory banks, the number of filtering units, the number of video channels generated by the filtering units, etc.

Media Processor 310

Figure 16:
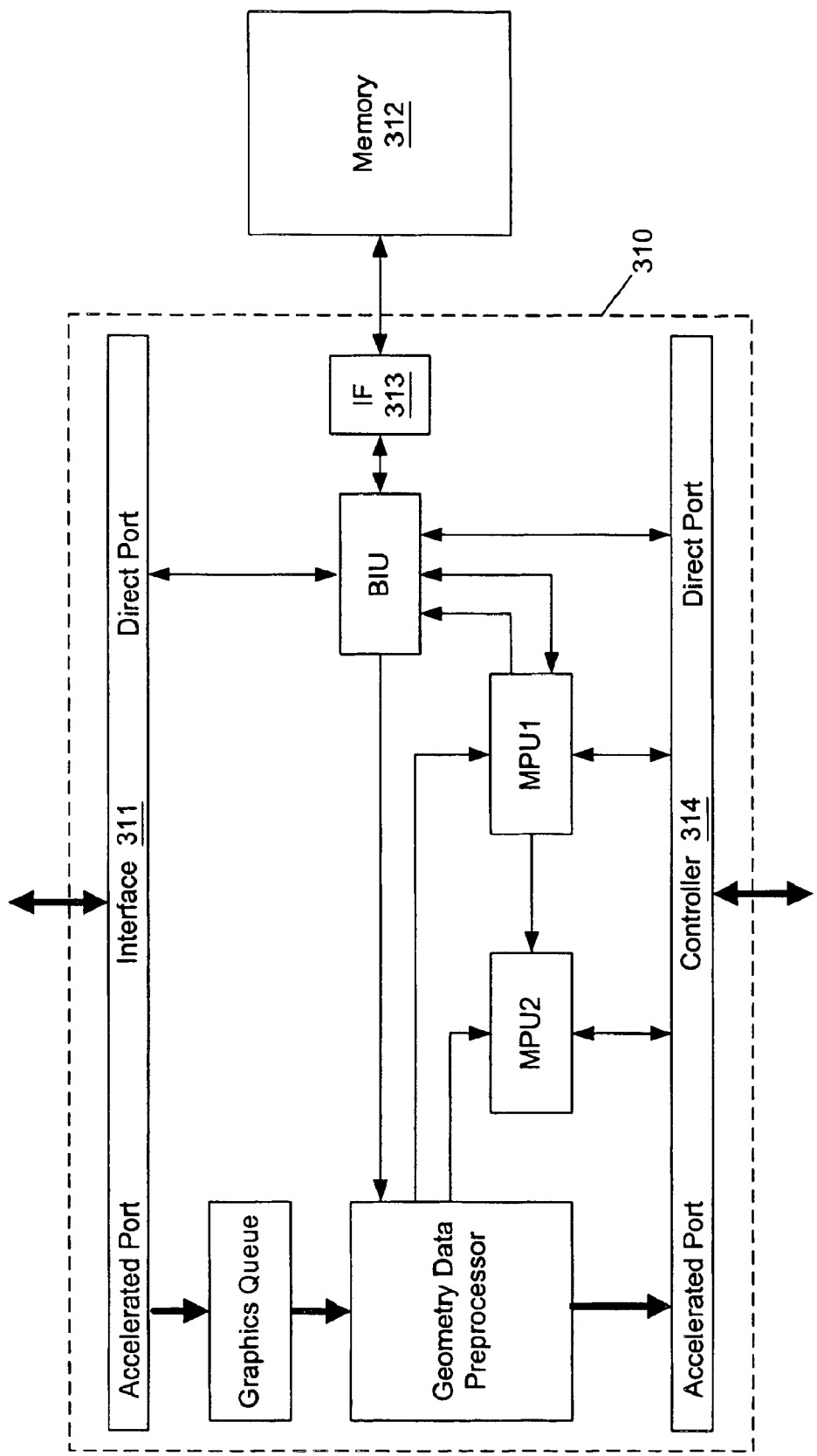
FIG. 16 is a block diagram of one embodiment of media processor 310.

FIG. 16 illustrates one embodiment of the media processor 310. The media processor 310 receives a stream of graphics data from the control unit 200 through an interface 311. A graphics queue may buffer the stream of data received via the accelerated port of the interface 311. The received graphics data may include graphics primitives. The media processor 310 may also include a geometry data preprocessor (GPP) and one or more microprocessor units (MPUs). The microprocessor units may be programmed to perform vertex transformation, lighting calculations and various other functions, and to send the results to rendering unit 320. The microprocessor units may also have read/write access to texels (i.e. the smallest addressable unit of a texture map) in the rendering unit 320. The geometry data preprocessor may be configured to decompress geometry data, to convert and format vertex data, to dispatch vertices and instructions to the microprocessor units, and to send vertex and attribute tags or register data to rendering unit 320.

Media processor 310 may include an interface 313 to memory 312. Memory 312 may be used for program and/or data storage for the microprocessor units. Memory 312 may also be used to store display lists and/or vertex texture maps.

In addition, media processor 310 may include a controller 314 for interfacing with rendering unit 320. The controller 315 may include an accelerated port path that allows media processor 310 to control rendering unit 320. The bus interface unit BIU provides a path to memory 312 via interface 313 and a path to rendering unit 320 via the controller 314.

Rendering Unit 320

Figure 17:
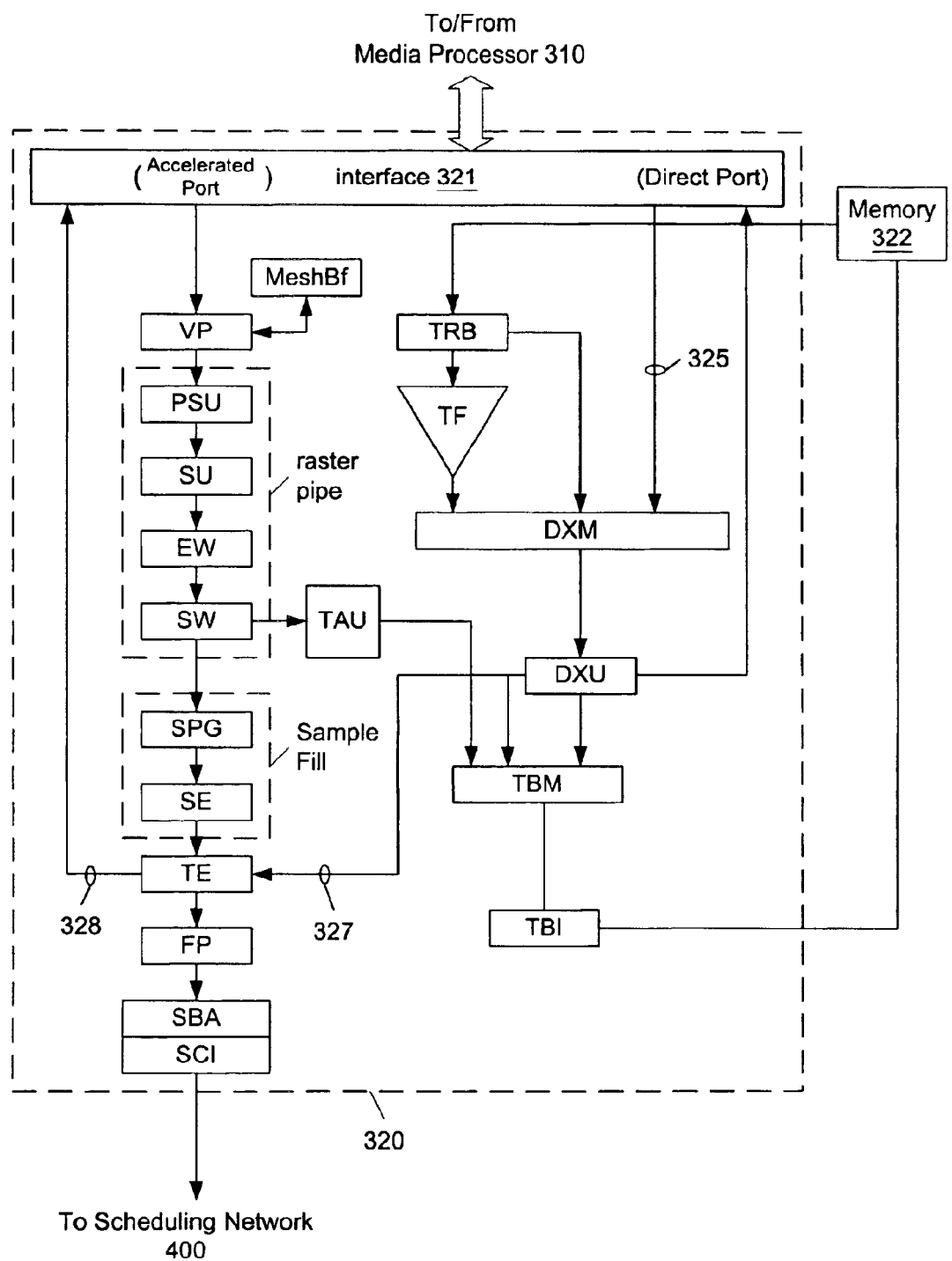
FIG. 17 is a block diagram of one embodiment of rendering unit 320.

FIG. 17 illustrates one embodiment of rendering unit 320. Rendering unit 320 may include an interface 321 for communicating with media processor 310. Interface 321 may receive graphics data and commands from media processor 310, and forward the graphics data and commands to vertex processor VP, data transfer multiplexor DXM, and/or, data transfer unit DXU.

Vertex processor VP may receive a stream of vertices from interface 321 and assemble the vertices into distinct primitives (e.g. triangles), and pass the primitives to a presetup unit PSU. The vertices may carry connectivity information that specifies how the vertices are to be assembled into primitives. Vertices may be saved in and/or retrieved from a mesh buffer MSHB.

The presetup unit PSU and setup unit SU may compute parameters that will be needed downstream, e.g., parameters such as the edge slopes, vertical and horizontal rates of change of red, green, blue, alpha, Z, etc. A triangle may be rendered by walking a bin (or a rectangle of bins, e.g., a 2×2 square of bins) across successive spans which cover the triangle. A span may traverse the triangle horizontally or vertically depending on the triangle. The edge walker EW may identify points on opposite edges of the triangle that define the endpoints of each span. The span walker SW may step across each span generating the addresses of successive bins (or rectangles) along the span.

The presetup unit PSU, setup unit SU, edge walker EW and span walker are collectively referred to as the raster pipe.

The sample position generator SPG may populate each bin along a span with sample positions. The sample evaluator SE may determine which of the sample positions in each bin reside interior to the current triangle. Furthermore, the sample evaluator SE may interpolate color, alpha and Z for the interior sample positions based on the parameters computed earlier in the pipeline. The sample position generator and sample evaluation are collectively referred to as the sample fill unit.

The texture environment unit TE may apply one or more layers of texture to the interior samples of each bin. Texture layers and/or other image information may be stored in memory 322. Texture filter TF accesses texels from memory 322 based on address information provided by texture address unit TAU, and filters the texels to generate texture values that are forwarded to the texture environment unit TE for application to samples. The texture address unit 168 may generate the texture memory addresses from texture coordinate information that is provided by the span walker SW per bin. After any desired texturing, samples may be sent down to the scheduling network 400 through the fragment processor FP, sample buffer address unit SBA and interface SCI.

Rendering unit 320 may also include an interface TBI to memory 322. (Memory 322 may serve as a texture buffer.) In one embodiment, rendering unit 320 may interface to memory 322 using an eight-way interleaved texel bus that allows rendering unit 320 to read from and write to memory 322.

Note that rendering unit 320 includes two paths to the texture environment unit TE. The "stream path" includes the vertex processor, the raster pipeline and the sample fill pipeline. The "direct path" include write bus 325, data transfer multiplexor DXM, data transfer unit DXU and bus 327. Data from the two paths may merge at the texture environment unit. The texture environment unit may include a synchronization register accessible by the microprocessor units of the media processor through bus 328. The synchronization register may be used to synchronize the flow of data through the stream path and the direct path as disclosed in U.S. patent application Ser. No. 10/093,835 filed on Mar. 8, 2002, entitled "Graphics Data Synchronization With Multiple Data Paths in a Graphics Accelerator", invented by Lavelle et al. This patent application is hereby incorporated by reference in its entirety.

Ordered Versus Unordered Processing

The rendering engine 300 and scheduling network 400 may be configured to support an unordered processing or ordered processing through the use of tokens (e.g. master stop, slave stop and master resume tokens) as disclosed in U.S. patent application Ser. No. 09/894,484, filed on Jun. 28, 2001, entitled "Graphics System Configured to Parallel-Process Graphics Data Using Multiple Pipelines". This patent application is hereby incorporated by reference in its entirety.

To initiate ordered processing mode in a selected rendering pipeline, the control unit 200 may send a master stop token down the selected rendering pipeline, and slave stop tokens down the other rendering pipelines. The master stop token and slave stop tokens flow down to the scheduling network 400 where they induce blockage of the corresponding rendering pipelines. Blockage of a rendering pipeline means that data from pipeline is inhibited from flowing through the scheduling network 400. When all the tokens have arrived, the scheduling network may unblock the selected rendering pipeline. When ordered processing through the selected rendering pipeline is no longer desired, the control unit 200 may restore an unordered processing mode by sending a resume token down the selected rendering pipeline to the scheduling network 400. When the resume token arrive at the scheduling network, it induces cancellation of the slave stop tokens, and thus, release of the other rendering pipelines. Thus, all rendering pipelines are free to send their data through the scheduling network, e.g., to sample buffer 500.

Context Switching

The graphics accelerator 100 supports context switching. Context switching allows the state of the graphics accelerator 100 to be stored away, and a new state to be loaded, so that a different execution thread may take control of the graphics accelerator 100, making it appear that each thread has its own virtual copy of the graphics accelerator 100.

As described above, each rendering pipeline RP(K), K=0, 1, 2, . . . , $N_{PL}-1$, may include a media processor 310 and a rendering unit 320. The media processor couples to a corresponding memory 312 (e.g. an RDRAM memory). The media processor in rendering pipeline RP(K) will be referred to as media processor 310(K). The rendering unit in rendering pipeline RP(K) will be referred to as rendering unit 320(K), and the memory 312 in rendering pipeline RP(K) will be referred to herein as memory 312(K). A similar convention will be used for other processing units in rendering pipeline RP(K).

Driver software executing on the host computer may store context-switching information for each media processor 310(K), K=0, 1, 2, . . . , $N_{PL}-1$, in a mailbox BX(K) set up in the corresponding memory 312(K).

The driver software may send a context-switch indication (e.g. an interrupt or a token) to each of the media processors 310(0), 310(1), . . . , 310($N_P-1$). In response to receiving the context-switch indication, a microcode process MCP(K) executing in media processor 310(K), K=0, 1, 2, . . . , $N_{PL}-1$, may read a context storage address from the corresponding mailbox BX(K), and initiate a context-save procedure to save (a) state information of media processor 310(K) and (b) state information of rendering unit 320(K) to an area of memory 312(K) defined by the context storage address. The microcode processor MCP(K) may execute on one or both of the microprocessor units in media processor 310(K). The driver software will have previously loaded the context storage address in the mailbox BX(K).

Figure 18:
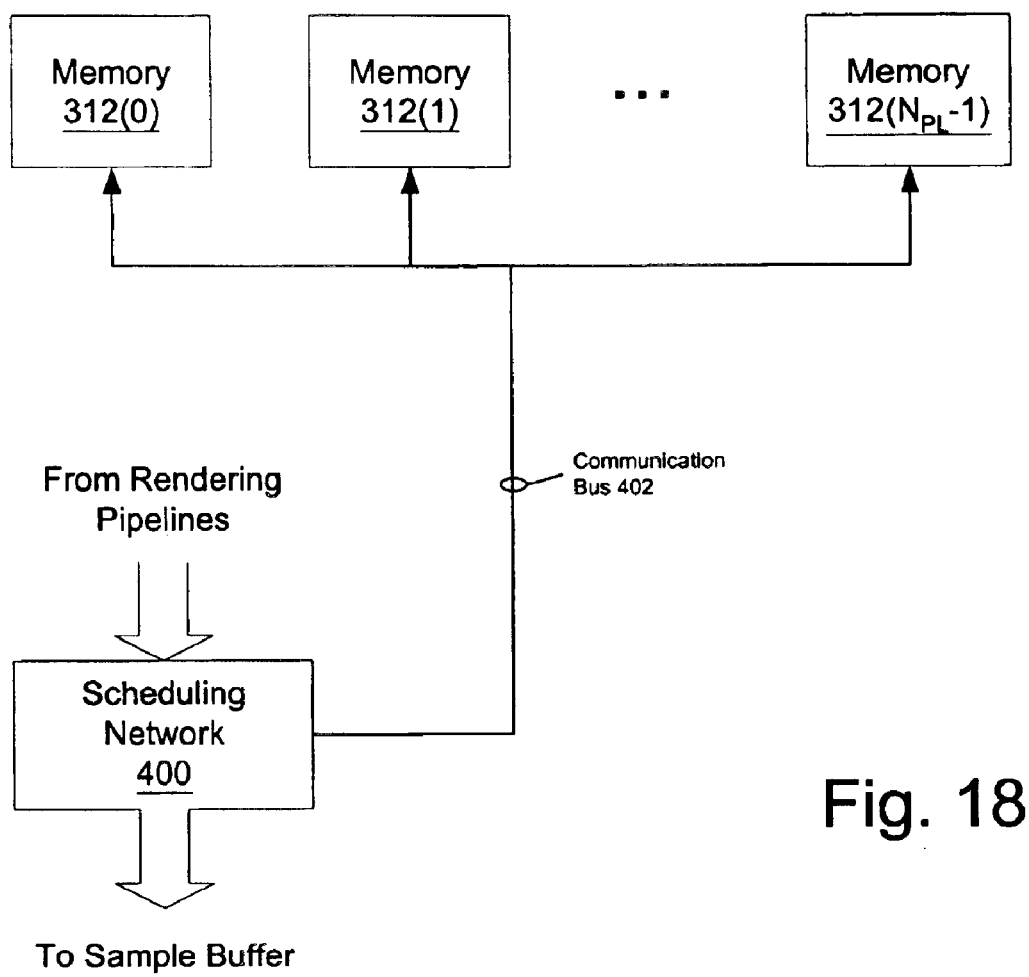
FIG. 18 illustrates one embodiment of the communication bus 402 coupling the scheduling network 400 and the memories 312 in each of the rendering pipelines.

The microcode process MCP(K) may be responsible for storing the current state of the media processor 310(K) and the rendering unit 320(K). The microcode process MCP(K) may read a first subset of the state information of the rendering unit 320(K) through controller 314(K), and transfer the first subset of state information to memory 312(K) through the bus interface unit BIU(K) and interface 313(K). State information in the rendering unit 320(K) may also be transferred to memory 312(K) through a more circuitous route as follows. Scheduling network 400 couples to each memory 312(K) through a communication bus 402. (FIG. 18 illustrates one embodiment of the communication bus 402.) Thus, the microcode process MCP(K) may command the transfer of a second subset of the state information of the rendering unit 320(K) through scheduling unit 400 and the communication bus to the memory 312(K). The first subset of state information may be registers and buffers in rendering unit 320(K) that are readily accessible to the microcode process MCP(K). The second subset of state information may be registers and buffers that are "deep down" in the rendering unit 320(K), and thus, more easily delivered to memory 312(K) through the circuitous route.

As described above, the geometry data preprocessor GDP (K) in each media processor 310(K) may be configured to decompress and format geometry commands and to pass the commands to the microprocessor unit through an intermediate buffer IBF(K). In response to the context-switch indication, the geometry data preprocessor GDP(K) may terminate processing. Thus, there may be a partially completed command in the intermediate buffer IBF(K). This partially completed command is part of the state information that is saved by the microcode process MCP(K). In one embodiment, any completed commands in the intermediate buffer IBF(K) may be processed and forwarded down the stream path of the rendering unit 320(K) as usual. In another embodiment, any completed commands in the intermediate buffer IBF(K) may be saved as part of the state information.

Thus, in response to receiving a context-switch indication from the driver software, each microcode process MCP(K), K=0, 1, 2, . . . , $N_{PL}-1$, may (1) store the current state information of the media processor 310(K) to memory 312(K) through the bus interface unit BIU(K) and interface 313(K);

(2) read a first subset of the state information of rendering unit 320(K) through controller 314, and transfer the first subset of state information to memory 312(K) through the bus interface BIU(K) and interface 313(K);

(3) command the transfer of a second subset of the state information of rendering unit 320(K) through scheduling network 400 and the communication bus to memory 312(K).

During ordered processing mode, a single rendering pipeline is active (i.e. allowed to send data down through scheduling network 400 to the sample buffer 500 or the corresponding memory 312), and the other rendering pipelines are blocked by slave stop tokens in the scheduling network 400 as disclosed in U.S. patent application Ser. No. 09/894,484. As used herein, the term "active media processor" is used to refer to the media processor of the active rendering pipeline. Similarly, the term "active rendering unit" is used to refer to the rendering unit of the active rendering pipeline.

To guarantee the delivery of state information from the blocked rendering pipelines, the microcode process of the active media processor may restore unordered processing mode by sending a resume token through the active rendering unit to the scheduling network 400. When the resume token arrives at the scheduling network 400, it induces cancellation of the slave stop tokens, and thus, restoration of unordered processing mode as disclosed in U.S. patent application Ser. No. 09/894,484. In unordered processing mode, the context information from the formerly blocked rendering pipelines is free to flow through the scheduling unit 400, and thence, to corresponding memories 312.

The driver software stores an authorization parameter in the mailbox of the active media processor. The authorization parameter may take one of two values, AUTHORIZED or UNAUTHORIZED, indicating whether or not the microcode process of the active media processor is to authorized to initiate the resume token in response to a context-switch indication. The microcode process reads the authorization parameter from the mailbox to determine how it is to behave in response to a context-switch indication.

The microcode process in the active media processor may send the resume token to the scheduling unit through the direct path of the active rendering unit. However, prior to sending the resume token, the microcode process may flush the stream path of the active rendering unit by sending a clear token down the stream path. The microcode process may poll the synchronization register in the texture environment to determine when the clear token arrives at the texture environment unit. (The synchronization register of the texture environment unit is accessible through bus 328.) The arrival of the clear token at the texture environment unit TE implies that the stream path is clear. When the microcode process determines that the clear token has arrived in the synchronization register, the microcode process may send the resume token through the direct path and the texture environment to the scheduling network 400.

In response to receiving a context-switch indication during ordered processing mode, the microcode process in the active media processor 310 may:

(1) store the state information of the active media processor to the corresponding memory 312 through the bus interface unit BIU and interface 313;

(2) read a first subset of the state information of the active rendering unit through controller 314, and transfer the first subset of state information to the corresponding memory 312 through the bus interface unit BIU and interface 313;

(3) command the transfer of a second subset of the state information of the active rendering unit through scheduling network 400 to memory 312(K);

(4) send a clear token down the stream path of the active rendering unit 312;

(5) poll a synchronization register in the texture environment unit TE to determine when the clear token arrives at the synchronization register;

(6) send a resume token through the direct path of the active rendering unit to the scheduling network 400, in response to determining that the clear token has arrived at the synchronization register.

When the resume token reaches the scheduling network 400, it induces cancellation of the slave stop tokens, and thus, restoration of unordered processing mode. The formerly blocked rendering pipelines are unblocked, and thus, their second subsets of state information may flow through the scheduling network 400 and the communication bus to their respective memories $312(0), 312(1), \ldots, 312(N_{PL}-1)$.

Figure 19:
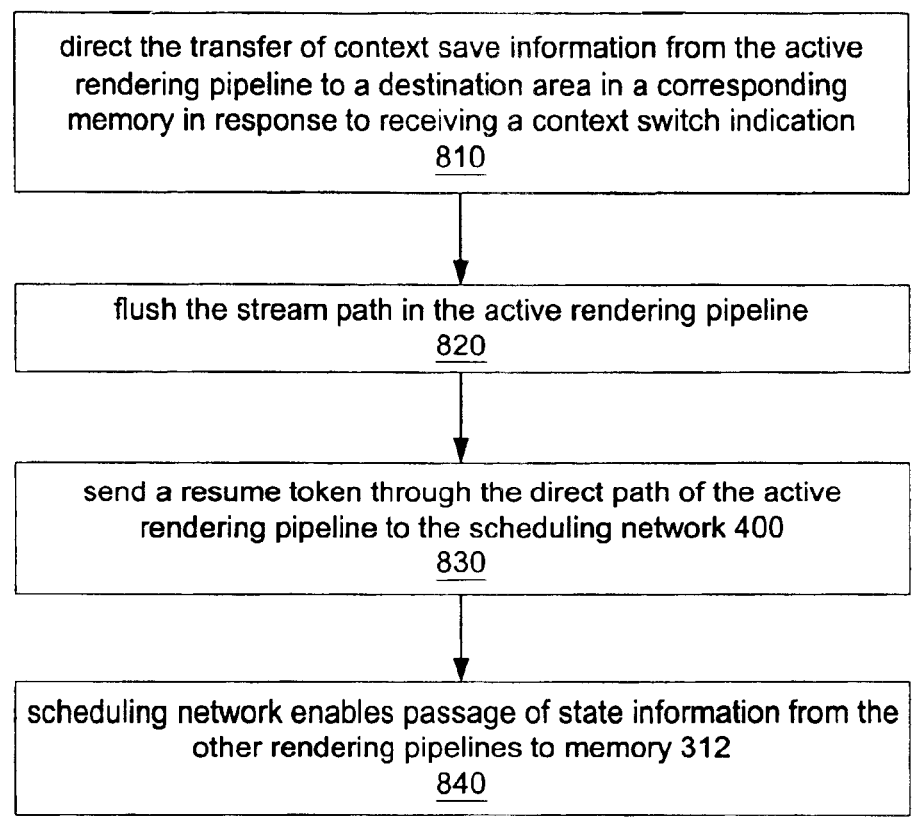
FIG. 19 illustrates a method for performing a context save operation in response to a context switching indication according to one set of embodiments.

In one set of embodiments, the microcode process executing in the active media processor may perform a context save operation as illustrated in FIG. 19.

In step 810, the microcode process may direct the transfer of context save information from the active rendering pipeline to a destination area in the corresponding memory 312 in response to receiving a context switch indication (e.g. from the host driver software). As noted above, the microcode process may access a first subset of the state information from the active rendering pipelines, and send the first subset of the state information to memory 312 through interface 313. A second subset of the state information from the active rendering pipeline may not be readily accessible. Thus, the microcode process may command the transfer of the second subset of state information to the memory 312 through scheduling network 400 and communication bus 402.

In step 820, the microcode process may flush the stream path in the rendering pipeline, e.g., by sending a clear token through the stream path and waiting for the clear token to appear in the synchronization register.

In step 830, the microcode process may send a resume token through the direct path of the active rendering pipeline to the scheduling network 400. When the resume token arrives at the scheduling network 400, the scheduling network 400 enables the passage of state information from the other rendering pipelines through the scheduling unit 400 and communication bus 402 to memory 312.

Numerous variations and modifications will become apparent to those skilled in the art once the above disclosure is fully appreciated. It is intended that the following claims be interpreted to embrace all such variations and modifications.

What is claimed is:

1. A graphics system comprising:

a plurality of parallel rendering pipelines, wherein each of the rendering pipelines includes a media processor, a rendering unit and a memory;

a scheduling network coupled to the plurality of rendering pipelines;

a communication bus coupled to the scheduling network and the memory of each rendering pipeline;

wherein the media processor in each of the rendering pipelines is configured to direct the saving of state information of the corresponding rendering pipeline to the corresponding memory in response to receiving a corresponding context switch indication;

wherein a first of the media processors in a first of the rendering pipelines is configured to initiate the transfer of a resume token to the scheduling network through the first rendering pipeline in response to receiving the corresponding context switch indication during an ordered processing mode;

wherein the scheduling network is configured to unblock one or more rendering pipelines other than the first rendering pipeline in response to receiving the resume token, wherein said unblocking of said one or more rendering pipelines allows the state information of said one or more rendering pipelines to flow through the scheduling network and communication bus to the corresponding memories.

2. The graphics system of claim 1, wherein the first rendering pipeline is the rendering pipeline which is active during the ordered processing mode.

3. The graphics system of claim 1, wherein said one or more rendering pipelines other than the first rendering pipeline includes all the rendering pipelines other than the first rendering pipeline.

4. The graphics system of claim 1, wherein the media processor in each of the rendering pipelines (a) reads a first subset of the state information of the corresponding rendering unit and transfers the first subset to the corresponding memory, and (b) commands the transfer of a second subset of the state information in the corresponding rendering unit to the corresponding memory through the scheduling network and the communication bus.

5. The graphics system of claim 1, wherein the state information of the corresponding rendering pipeline includes state information of the corresponding media processor and state information of the corresponding rendering unit.

6. The graphics system of claim 1, wherein a microcode process executing in the media processor of each of the rendering pipelines is configured to direct the saving of state information of the corresponding rendering pipeline to the corresponding memory in response to receiving a corresponding context switch indication.

7. The graphics system of claim 1, wherein a first microcode process executing in the first media processor is configured to initiate the transfer of a resume token to the scheduling network through the first rendering pipeline in response to receiving the corresponding context switch indication during an ordered processing mode.

8. The graphics system of claim 1, wherein the first microcode routine is configured to send a clear token through a stream path in the corresponding rendering unit and to repeatedly read from a synchronization register in the corresponding rendering unit to determine when the clear token arrives at a synchronization register in the corresponding rendering unit.

9. The graphics system of claim 8, wherein the first microcode routine sends the resume token through a direct path of the corresponding rendering unit after the clear token arrives at the synchronization register.

10. The graphic system of claim 9, wherein the stream path operates on graphics primitive to generate samples, wherein data from the stream path and data from the direct path merge in a processing unit, wherein the processing unit loads the clear token into the synchronization register when the clear token arrives at the processing unit through the stream path.

11. The graphics system of claim 1, wherein each of the parallel rendering pipelines are configured to generate samples in response to received graphics data, and to forward the samples to the scheduling network for storage in a sample buffer.

12. The graphics system of claim 11 further comprising a filtering engine configured to read the samples from the sample buffer and to filter to the samples to generate video pixels.

13. The graphics system of claim 1, wherein the context switch indications are sent from a driver software routine executing on a host computer system.

14. The graphics system of claim 1, wherein the driver software routine sends the context switch indications in response to a context switch message from an operating system executing on the host computer system.

15. A graphics system comprising:
a plurality of rendering pipelines, wherein each of the rendering pipelines includes a media processor and a rendering unit;
a scheduling network coupled to the plurality of rendering units;
wherein, during an ordered processing mode, a first of the rendering pipelines is active and remaining rendering pipelines are blocked from passing data through the scheduling network;
wherein a microcode process executing in the media processor of the first rendering pipeline is configured to initiate a transfer of a resume token to the scheduling network through the corresponding rendering unit in response to receiving a context switch indication during the ordered processing mode;
wherein the scheduling network is configured unblock the remaining rendering pipelines in response to receiving the resume token.

16. The graphics system of claim 15, wherein said unblocking of the remaining rendering pipelines enables the remaining rendering pipelines to pass corresponding state information through the scheduling network to context save areas in a corresponding set of memories.

17. The graphics system of claim 15, wherein a microcode process executing in the media processor of each of the rendering pipelines, including the first rendering pipeline, is configured to direct a transfer of state information for the corresponding rendering pipeline to a corresponding memory.

18. The graphics system of claim 15, wherein each of the memories includes a mailbox, wherein a driver software routine executing on a host computer loads context storage addresses into the mailboxes, wherein the microcode process executing in the media processor of each rendering pipeline is configured to read the context storage address from the corresponding mailbox, and to direct the transfer of the state information for the corresponding rendering pipeline to a region in the corresponding memory defined by the context storage address.

19. The graphics system of claim 15, wherein each of the rendering pipelines are configured generate samples in response to received graphics data, and to forward the samples to the scheduling network for storage in a sample buffer.

20. The graphics system of claim 19 further comprising a filtering engine configured to read the samples from the sample buffer and to filter to the samples to generate video pixels.

21. A method comprising:
directing a transfer of context save information from a first rendering pipeline to a destination area in a memory in response to receiving a context switch indication;
flushing a first path in the first rendering pipeline;
sending a resume token through a second path in the first rendering pipeline;
wherein said sending of the resume token enables the passage of state information from other rendering pipelines through a scheduling unit.

22. The method of claim 21 further comprising reading a mailbox in the memory to obtain a context storage address, wherein the context storage address defines the destination area in the memory.

23. A graphics system comprising:
a plurality of parallel rendering pipelines, wherein each of the rendering pipelines includes a media processor, a rendering unit and a memory;
wherein the media processor in each of the rendering pipelines is configured to direct the saving of state information of the corresponding rendering pipeline to the corresponding memory in response to receiving a corresponding context switch indication;
wherein a first of the media processors in a first of the rendering pipelines is configured to initiate the transfer of a resume token in response to receiving the corresponding context switch indication during an ordered processing mode;
wherein one or more rendering pipelines other than the first rendering pipeline are operable to be unblocked in response to the resume token being received, wherein said unblocking of said one or more rendering pipelines allows the state information of said one or more rendering pipelines to flow to the corresponding memories.

24. A graphics system comprising:
a plurality of rendering pipelines, wherein each of the rendering pipelines includes a media processor, a rendering unit and a memory;
a scheduling network coupled to the plurality of rendering units and the plurality of memories;
wherein, during an ordered processing mode, a first of the rendering pipelines is active and remaining rendering pipelines are blocked from passing data through the scheduling network;
wherein a microcode process executing in the media processor of the first rendering pipeline is configured to (a) read an authorization parameter from a mailbox area in the corresponding memory in response to receiving a context switch indication during the ordered processing mode and (b) initiate a transfer of a resume token to the scheduling network through the corresponding rendering unit in response to a determination that the authorization parameter equals a first value indicating a grant of authorization;
wherein the scheduling network is configured to unblock the remaining rendering pipelines in response to receiving the resume token.

25. The graphics system of claim 24, wherein said unblocking of the remaining rendering pipelines enables the remaining rendering pipelines to pass corresponding state information through the scheduling network to context save areas in the corresponding memories.

26. The graphics system of claim 24, wherein a microcode process executing in the media processor of each of the rendering pipelines, including the first rendering pipeline, is configured to direct a transfer of state information for the corresponding rendering pipeline to the corresponding memory.

27. The graphics system of claim 24, wherein each of the memories includes a corresponding mailbox area, wherein a driver software routine executing on a host computer loads context storage addresses into the mailbox areas, wherein the microcode process executing in the media processor of each rendering pipeline is configured to read the context storage address from the corresponding mailbox, and to direct the transfer of the state information for the corresponding rendering pipeline to a region in the corresponding memory defined by the context storage address.

* * * * *